United States Patent
Menges

(10) Patent No.: US 12,442,358 B1
(45) Date of Patent: *Oct. 14, 2025

(54) ENERGY STORAGE SYSTEM

(71) Applicant: Star Sailor Energy, Inc., Cincinnati, OH (US)

(72) Inventor: Pamela A. Menges, Cincinnati, OH (US)

(73) Assignee: STAR SAILOR ENERGY, INC., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,501

(22) Filed: Mar. 16, 2023

Related U.S. Application Data

(60) Division of application No. 17/226,576, filed on Apr. 9, 2021, now Pat. No. 11,644,010, which is a (Continued)

(51) Int. Cl.
  *F03D 9/12* (2016.01)
  *F03D 3/00* (2006.01)
  (Continued)

(52) U.S. Cl.
  CPC .............. *F03D 9/12* (2016.05); *F03D 3/002* (2013.01); *F03D 3/005* (2013.01); *F03D 3/02* (2013.01); *F03D 3/0418* (2013.01); *F03D 7/00* (2013.01); *F03D 9/007* (2013.01); *F03D 9/25* (2016.05); *F03D 15/20* (2016.05); *F03D 17/00* (2016.05); *H02K 7/183* (2013.01); *H02S 10/12* (2014.12); *F05B 2240/216* (2013.01); *F05B 2240/911* (2013.01); *Y02E 10/46* (2013.01); *Y02E 10/728* (2013.01); *Y02E 10/74* (2013.01); *Y02E 60/16* (2013.01)

(58) Field of Classification Search
  CPC ...... F03D 3/005; F03D 7/00; F05B 2240/216; F05B 2240/911; Y02E 10/728; Y02E 10/74

See application file for complete search history.

(56) References Cited

U.S. PATENT DOCUMENTS

| 222,256 A | 12/1879 | Dewees |
|---|---|---|
| 273,642 A | 3/1883 | Toomes |

(Continued)

FOREIGN PATENT DOCUMENTS

| DE | 40 39 203 A1 | 2/1992 |
|---|---|---|
| DE | 43 22 058 A1 | 2/1994 |

(Continued)

OTHER PUBLICATIONS

PCT/US07/13368 International Preliminary Report on Patentability dated Mar. 1, 2009.

(Continued)

*Primary Examiner* — Sean Gugger
(74) *Attorney, Agent, or Firm* — Mark F. Smith; Smith Brandenburg Ltd.

(57) ABSTRACT

The present invention is an energy storage system comprising a mechanical bellows having an outer flexible material casing with one or more functional elements that operate as actuators for expanding and contracting the outer flexible material casing to store or deliver energy.

17 Claims, 45 Drawing Sheets

Related U.S. Application Data continuation-in-part of application No. 15/873,155, filed on Jan. 17, 2018, now Pat. No. 11,015,578, which is a continuation-in-part of application No. 15/142,559, filed on Apr. 29, 2016, now abandoned, which is a division of application No. 14/132,312, filed on Dec. 18, 2013, now Pat. No. 9,366,228, which is a division of application No. 12/928,827, filed on Dec. 20, 2010, now Pat. No. 8,648,481, which is a continuation-in-part of application No. 11/810,401, filed on Jun. 5, 2007, now Pat. No. 7,880,323.

(60) Provisional application No. 60/850,613, filed on Oct. 10, 2006, provisional application No. 60/812,466, filed on Jun. 10, 2006.

(51) Int. Cl.
| | | |
|---|---|---|
| *F03D 3/02* | (2006.01) | |
| *F03D 3/04* | (2006.01) | |
| *F03D 7/00* | (2006.01) | |
| *F03D 9/00* | (2016.01) | |
| *F03D 9/25* | (2016.01) | |
| *F03D 15/20* | (2016.01) | |
| *F03D 17/00* | (2016.01) | |
| *H02K 7/18* | (2006.01) | |
| *H02S 10/12* | (2014.01) | |

(56) References Cited

U.S. PATENT DOCUMENTS

| | | |
|---|---|---|
| 2,230,526 A | 2/1941 | Claytor |
| 2,484,197 A | 10/1949 | Veldhuis |
| 2,844,960 A | 7/1958 | Basil |
| 3,042,371 A | 7/1962 | Fanti |
| 3,426,214 A | 2/1969 | O'Malley |
| 3,617,390 A | 11/1971 | De Bucs |
| 3,621,930 A | 11/1971 | Dutchak |
| 3,937,148 A | 2/1976 | Simpson |
| 4,030,298 A | 6/1977 | Sandoval |
| 4,039,849 A | 8/1977 | Mater et al. |
| 4,084,918 A | 4/1978 | Pavlecka |
| 4,109,465 A | 8/1978 | Plen |
| 4,161,169 A | 7/1979 | Brussels |
| 4,192,290 A | 3/1980 | Jensen |
| 4,242,628 A | 12/1980 | Mohan et al. |
| 4,289,444 A | 9/1981 | Monk et al. |
| 4,630,997 A | 12/1986 | Cousteau et al. |
| 4,697,761 A | 10/1987 | Long |
| 5,075,564 A | 12/1991 | Hickey |
| 5,140,170 A | 8/1992 | Henderson |
| 5,463,257 A | 10/1995 | Yea |
| 5,572,816 A | 11/1996 | Anderson, Jr. et al. |
| 5,852,353 A | 12/1998 | Kochanneck |
| 6,138,956 A | 10/2000 | Monner |
| 6,164,599 A | 12/2000 | Piening et al. |
| 6,242,818 B1 | 6/2001 | Smedley |
| 6,382,904 B1 | 5/2002 | Orlov et al. |
| 6,419,187 B1 | 7/2002 | Buter et al. |
| 6,432,379 B1 | 8/2002 | Heung |
| 6,465,902 B1 | 10/2002 | Beauchamp et al. |
| 6,638,005 B2 | 10/2003 | Holter et al. |
| 6,717,284 B2 | 4/2004 | Lin |
| 6,724,097 B1 | 4/2004 | Wobben |
| 6,765,309 B2 | 7/2004 | Tallal, Jr. et al. |
| 6,777,610 B2 | 8/2004 | Yamada |
| 6,781,284 B1 | 8/2004 | Peirine et al. |
| 6,809,432 B1 | 10/2004 | Bilgen |
| 6,833,234 B1 * | 12/2004 | Bloomstein ............... G03F 7/00 |
| | | 430/311 |
| 6,850,821 B2 | 2/2005 | Weitkamp |
| 6,925,385 B2 | 8/2005 | Ghosh et al. |
| 6,952,058 B2 | 10/2005 | McColn |
| 6,966,758 B2 | 11/2005 | Grabau et al. |
| 6,984,899 B1 | 1/2006 | Rice |
| 7,045,702 B2 | 5/2006 | Kashyap |
| 7,215,037 B2 | 5/2007 | Scalzi |
| 7,230,348 B2 | 6/2007 | Poole |
| 7,242,108 B1 | 7/2007 | Dable |
| 7,323,791 B2 | 1/2008 | Jonsson |
| 7,453,167 B2 | 11/2008 | Gilbert |
| 7,453,168 B2 | 11/2008 | Lanie |
| 7,758,299 B1 | 7/2010 | Jarecki |
| 7,880,323 B2 | 2/2011 | Menges |
| 9,500,158 B1 | 11/2016 | Anthony |
| 11,015,578 B2 | 5/2021 | Menges |
| 2001/0048089 A1 | 12/2001 | Clark et al. |
| 2003/0133782 A1 | 7/2003 | Holter et al. |
| 2003/0160454 A1 | 8/2003 | Manolis |
| 2003/0175109 A1 | 9/2003 | Brock et al. |
| 2003/0192323 A1 | 10/2003 | Poese |
| 2003/0218337 A1 | 11/2003 | Lin |
| 2004/0100103 A1 | 5/2004 | Becherocci et al. |
| 2004/0160059 A1 | 8/2004 | Pandian |
| 2004/0230377 A1 | 11/2004 | Ghosh et al. |
| 2005/0109386 A1 | 5/2005 | Marshall |
| 2006/0119224 A1 | 6/2006 | Koelian |
| 2007/0102938 A1 | 5/2007 | Poole |
| 2007/0267874 A1 | 11/2007 | Taylor |
| 2008/0060442 A1 | 3/2008 | Smith |
| 2008/0079263 A1 | 4/2008 | Morharia et al. |
| 2008/0131830 A1 | 6/2008 | Nix |
| 2008/0156317 A1 | 7/2008 | Yangpichit |
| 2008/0196758 A1 | 8/2008 | McGuire |
| 2009/0146432 A1 | 6/2009 | Ballena |
| 2009/0282840 A1 | 11/2009 | Chen |
| 2010/0032954 A1 | 2/2010 | Law |
| 2010/0259044 A1 | 10/2010 | Muchow |
| 2011/0226440 A1 | 9/2011 | Bissell |
| 2012/0055160 A1 | 3/2012 | Peng |
| 2012/0119510 A1 | 5/2012 | Herzen |
| 2012/0227926 A1 | 9/2012 | Field |
| 2013/0125956 A1 | 5/2013 | Furman |
| 2013/0236347 A1 | 9/2013 | Lundback |
| 2014/0007569 A1 | 1/2014 | Gayton |
| 2014/0072855 A1 | 3/2014 | Schaefer |
| 2014/0087231 A1 | 3/2014 | Schaefer |
| 2014/0113171 A1 | 4/2014 | Schaefer |
| 2014/0175799 A1 | 6/2014 | Tabe |
| 2014/0261425 A1 * | 9/2014 | Connor ............... A61M 16/06 |
| | | 128/204.23 |
| 2014/0338658 A1 | 11/2014 | Nix |
| 2016/0024924 A1 | 1/2016 | Anthony |
| 2016/0032889 A1 | 2/2016 | Tan |
| 2016/0123331 A1 | 5/2016 | Nix |
| 2016/0146193 A1 | 5/2016 | Garvey |
| 2016/0248132 A1 | 8/2016 | Kuhne et al. |
| 2018/0031333 A1 | 2/2018 | Altman |
| 2022/0361810 A1 * | 11/2022 | Price .................... A61B 5/7405 |

FOREIGN PATENT DOCUMENTS

| | | |
|---|---|---|
| DE | 195 30 253 A1 | 11/1996 |
| DE | 196 23 055 A1 | 1/1997 |
| DE | 100 10 258 A1 | 6/2001 |
| FR | 2267652 A1 | 11/1975 |
| FR | 2899651 A1 | 4/2006 |
| GB | 2 072 756 A | 10/1981 |
| JP | 411125171 A | 5/1999 |
| JP | 02000161196 A | 6/2000 |
| WO | WO 2006/123951 A1 | 11/2006 |
| WO | WO 2007/126704 A3 | 11/2007 |

OTHER PUBLICATIONS

Examiner Report dated Sep. 29, 2010 for application GB 0900439.1 related application.

Frisbee, Samuel, "Mechanical Analysis of the Trevelyan Rocker" (1878), Nature Publishing Group.

(56) References Cited

OTHER PUBLICATIONS

USPTO Office Action for U.S. Appl. No. 15/873,155, dated Dec. 31, 2018.
USPTO Office Action for U.S. Appl. No. 15/873,155, dated Apr. 15, 2019.
USPTO Office Action for U.S. Appl. No. 15/873,155, dated Nov. 5, 2019.
USPTO Office Action for U.S. Appl. No. 15/873,155, dated Mar. 27, 2020.
USPTO Office Action for U.S. Appl. No. 15/873,155, dated Sep. 18, 2020.
USPTO Office Action for U.S. Appl. No. 11/810,401, dated Mar. 5, 2009.
USPTO Office Action for U.S. Appl. No. 11/810,401, dated Mar. 23, 2010.
USPTO Office Action for U.S. Appl. No. 11/810,401, dated Sep. 14, 2009.
USPTO Office Action for U.S. Appl. No. 12/928,827, dated Apr. 12, 2013.
USPTO Office Action for U.S. Appl. No. 15/142,599, dated Jan. 3, 2017.
USPTO Office Action for U.S. Appl. No. 15/142,559, dated Jul. 18, 2017.
USPTO Office Action for U.S. Appl. No. 17/226,576, dated May 23, 2022.
USPTO Office Action for U.S. Appl. No. 17/226,576, dated Jan. 9, 2023.
USPTO Office Action for U.S. Appl. No. 17/226,576, dated Jan. 20, 2023.
USPTO Office Action for U.S. Appl. No. 17/226,576, dated Jan. 26, 2023.

\* cited by examiner

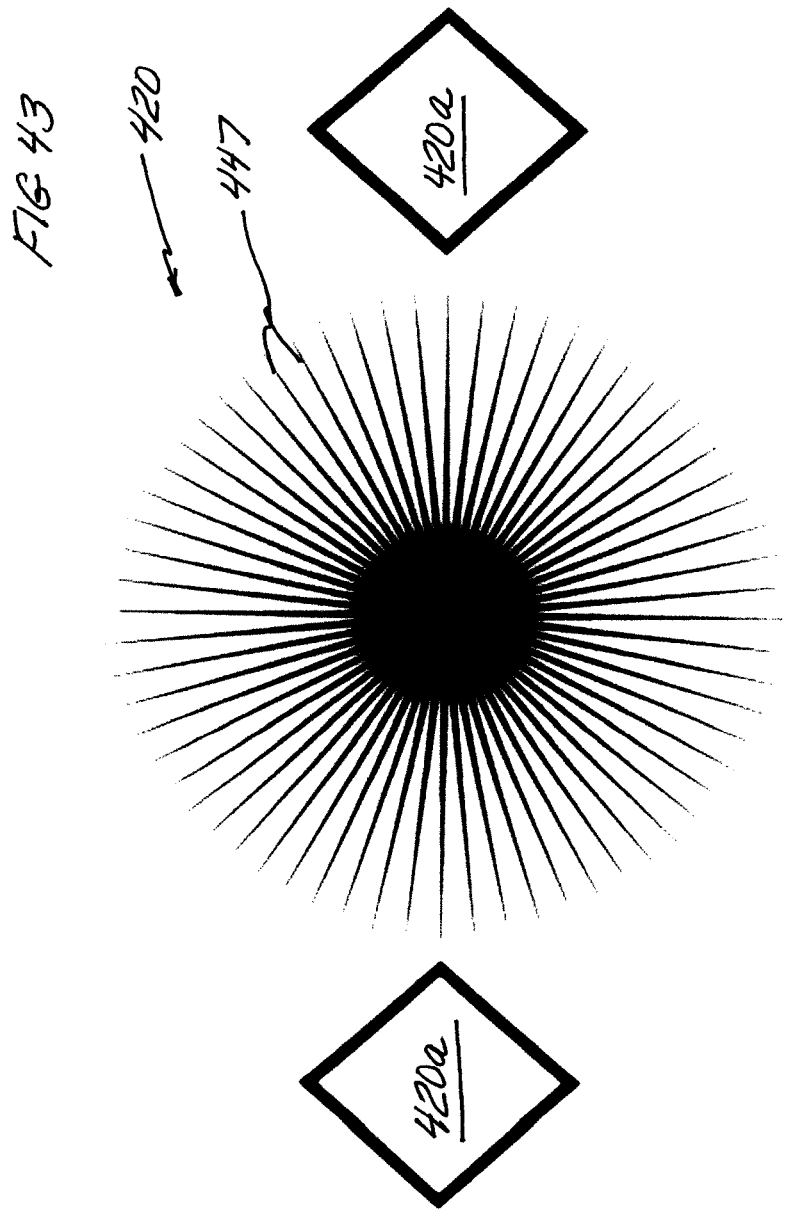

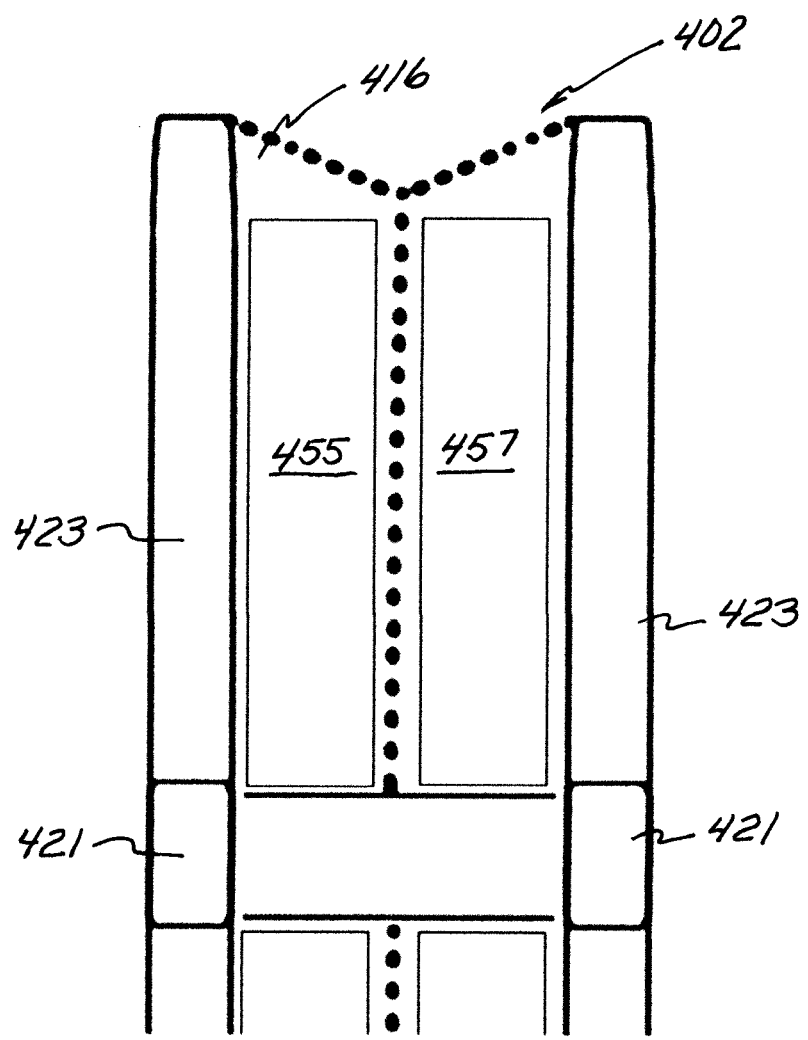

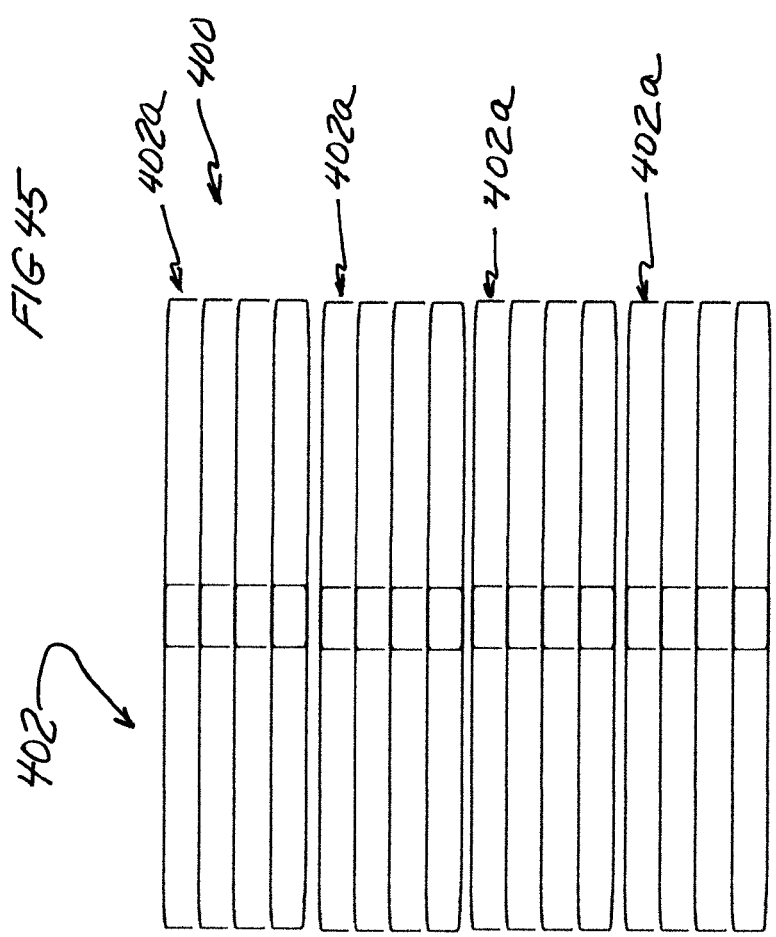

ENERGY STORAGE SYSTEM

CROSS-REFERENCE TO PRIOR APPLICATION

This is a divisional of U.S. patent application Ser. No. 17/226,576 filed Apr. 9, 2021 which is a continuation-in-part of U.S. patent Ser. No. 15/873,155 filed Jan. 17, 2018 (U.S. Pat. No. 11,015,578, issued May 15, 2021) which is a continuation-in-part of patent application Ser. No. 15/142,559 filed Apr. 29, 2016 which is a divisional patent application of U.S. patent application Ser. No. 14/132,312 filed Dec. 18, 2013 (U.S. Pat. No. 9,366,228 issued Jun. 14, 2016) that a divisional application of and claims benefit of U.S. Continuation-In-Part patent application Ser. No. 12/928,827 filed Dec. 20, 2012 (U.S. Pat. No. 8,648,481 issued Feb. 11, 2014), which claims benefit to U.S. patent application Ser. No. 11/810,401 filed Jun. 5, 2007 (U.S. Pat. No. 7,880,323 issued Feb. 1, 2011) that claims benefit to U.S. Provisional Patent Application Ser. No. 60/812,466 filed Jun. 10, 2006 and to U.S. Provisional Patent Application Ser. No. 60/850,613 filed Oct. 10, 2006, all of which are incorporated herein in their entirety.

TECHNICAL FIELD

The present invention is directed to an effective way of storing and delivering energy. Further, the invention includes an environmentally friendly energy storage system that operates to store energy such as that obtained from a wind generator system or other power generating systems.

BACKGROUND OF THE INVENTION

In recent years the need for alternative sources of electrical energy has grown significantly as a result of increased and uncertainty in oil prices, growing environmental concerns, and the lack of sufficient alternative energy supplies. Accordingly, wind generator systems have gained support as an alternate energy source. Wind generators have been shown to provide a safe and clean source of electric power. Systems, such as large or big wind generators, have been developed having large blades (often more than 18 feet in length) mounted on high towers that can produce more than 35 kilowatts (KW) of power with wind speeds of 20 knots. Such systems are typically used in combination with other wind generators, such as along coastal areas for providing electrical power directly to power grids. Such systems have also been used in rural areas, such as farms, for providing supplemental power or reducing electrical costs.

Small wind generators mounted on smaller towers have also been developed for use such as for residential application and have been used as remote or distributed power sources. Such systems are often connected to the main electric service to the home thereby allowing sufficient powering of the home and for sending excess power generated by the wind generator back to the power grid. Typically, these small wind generators rotate at speeds that vary with wind speed and have a plurality of blades that drive a rotor coupled to a gearbox that operates to increase the rotation speed of a generator for producing electric power.

In order to reduce maintenance and increase efficiency, systems have been developed having relatively large synchronous ring generators that permit the rotor to be directly coupled to the generator without the need of a gearbox. Unfortunately, while such systems have reduced maintenance costs and have increased the efficiency of the systems, wind generator systems continue to suffer from relatively significant maintenance costs. Further, forces being exerted to the systems due to wind increase in proportion to the cube of wind speed. Accordingly, high wind speeds often encountered by small wind generator systems, even if only occasional or momentary, can damage system components. This is particularly true for wind generators having relatively large blades such as typically required for small wind generators that depend on the relatively large blades to harvest lower-energy winds. Thus, small wind generator systems are typically designed having means for preventing system damage due to such high-speed winds. Such means include blade pitching, airfoil spoilers, blade tip breaks, and the like. Means such as braking means or means that act upon the entire blade apparatus rather than on individual blades have also been developed. Unfortunately, all such means significantly add to the complexity and expense of the wind generator systems and significantly add to their maintenance down time and costs. In addition, systems having such means typically require routine maintenance which significantly increases their operating costs. This is particularly true when parts or components must be repaired or replaced which often requires significant rebuild or major dismantling of the system to replace a component. Further, during operation, such means often result in significant power drops or the cessation of power generation during such high wind conditions.

Another problem associated with small wind generators is that they are often acoustically noisy and are undesirable for many residential applications. Further, small or low wind generator systems for mounting to building structures are generally not aesthetically pleasing, often require extensive building modifications, and are prohibited under many building codes.

Accordingly, due to the complexity of many wind generators used in small wind or distributed power the need for a simple modular and easy to maintain generator is significant in not just reducing cost to the consumer but in the cost of manufacture and maintenance. Further, environmentally friendly energy storage is one of the greatest challenges of the $21^{st}$ century. Hundreds of billions of dollars have been invested in fuel cells and chemical batteries. While such devices are capable of storing energy, they often are relatively expensive and can cause difficulty in properly disposing such devices.

Consequently, a need exists for a small wind generating system and energy storage system that has reduced cyclic cost, increased reliability and improved maintenance needs and costs, that is acoustically and aesthetically acceptable for residential operation, and which is relatively inexpensive to manufacture and install.

SUMMARY OF THE INVENTION

The present invention is a new and novel wind generator system particularly suitable for small wind applications that harnesses low velocity wind effectively. In a preferred embodiment of the invention, the wind generator system comprises a drive shaft; a plurality of blades attached to the drive shaft and extending radially outwardly therefrom; a generator assembly coupled to the drive shaft and effective for generating electrical power; and a housing having an inner chamber for receiving the plurality of blades and a wind directional apparatus that operates to adjust the speed of the wind and to channel wind along a desired flow pathway towards the plurality of blades.

In another preferred embodiment of the invention the wind generator system comprises means for sensing the direction and speed of wind at the location of the housing.

In another preferred embodiment of the invention the wind generator system comprises sensing means for monitoring the electrical power output of the wind generator system.

In another preferred embodiment of the invention the wind generator system comprises sensing means for monitoring the operational efficiency and condition of the wind generator system.

In another preferred embodiment of the invention the wind generator system comprises a communication and control means coupled to the sensing means whereby the communication and control means can communicate with an outside monitoring system.

In another preferred embodiment of the invention the communication and control means of one wind generator system can communicate with the communication and control means of another wind generator system.

In another preferred embodiment of the invention the blades comprise an aerodynamic adjustment element for adjusting the aerodynamic characteristic of the blades.

In another preferred embodiment of the invention the aerodynamic element is a thin film material.

In another preferred embodiment of the invention the aerodynamic element is a metallic composite coating.

In another preferred embodiment of the invention the aerodynamic element is formed from a shaped memory material or a functional material.

In another preferred embodiment of the invention the shaped memory alloy is Nitinol.

In another preferred embodiment of the invention the wind generator includes an energy enhancer element comprising a spindle assembly having a loop coupled to the drive shaft; and means for creating a temperature differential along a portion of the loop; wherein the loop is effective for increasing the rotational speed of the drive shaft when acted upon by the means for creating a temperature differential along a portion of the loop.

In another preferred embodiment of the invention the energy enhancer element having a loop comprising a wire or band formed from a shaped memory material or a functional material.

In another preferred embodiment of the invention the loop is formed from a shaped memory alloy.

In another preferred embodiment of the invention the blades comprise a photovoltaic substrate operable for generating electrical power.

In another preferred embodiment of the invention the photovoltaic substrate operates in response to infrared light.

In another preferred embodiment of the invention the wind directional apparatus comprises a plurality of rotatable slats.

Another preferred embodiment of the invention, a wind generator system comprises at least two stages of blades mounted to a drive shaft; each stage having at least one blade attached thereto and extending radially outwardly therefrom; a generator assembly coupled to the drive shaft and effective for generating electrical power; and a housing having an inner chamber for receiving each stage of at least one blade and a wind directional apparatus that operates to adjust airflow and to channel the wind along a desired flow pathway towards each of at least one blade.

In another preferred embodiment the wind generator system comprises rotatable slats having images thereon that change when the slats rotate.

In another preferred embodiment of the invention the housing includes a rotatable base that operates to rotate the wind generator system to optimize power generation.

In another preferred embodiment of the invention the individual components of the wind generator system are grouped into individual modules that can be easily installed or removed into the wind generator system.

In another preferred embodiment of the invention the housing of the wind generator system can be incorporated into a structure.

In another preferred embodiment of the invention the wind generator system comprises a wire or band formed from a shaped memory material or a functional material and effective for increasing the rotational speed of the drive shaft.

In another preferred embodiment of invention the wind generator system comprises an energy storage system.

In a preferred embodiment of the invention the energy storage system is a bellows having a multifunctional structure that harvests energy from its environment or from other mechanical or physical systems.

In another preferred embodiment of the invention the energy storage system is a mechanical bellows energy storage system.

In another preferred embodiment of the invention the energy storage system is a bellows that is a combined heat and power storage device providing thermal management and power generation.

In a preferred embodiment of the invention the bellows is operates as a radiator and energy storage device.

In a preferred embodiment of the invention the bellows operates as a radiator and thermal management device for solar concentrator cells.

In a preferred embodiment of the invention the bellows comprises a fabric embedded or integrated with sensors and other processing devices.

In a preferred embodiment of the invention the bellows is compressible to reduce volume of a space or satellite deployable radiator and energy storage device.

In a preferred embodiment of the invention the bellows is a compressible space deployable satellite.

In a preferred embodiment of the invention the bellows is integrated with a heat pipe acting as a thermal management and power storage and generating system.

In a preferred embodiment of the invention the bellows is integrated with a heat pipe acting as an engine.

In a preferred embodiment of the invention the bellows is a power drive device for rotating machinery and electrical generators.

In a preferred embodiment of the invention the bellows is configured individually or in a bank of bellows to be used for startup of an electrically driven system.

In a preferred embodiment of the invention the bellows operates to start up an automated device or robotic component.

In a preferred embodiment of the invention the bellows is an automated device or a robotic component.

In a preferred embodiment of the invention the bellows is a robotic actuator that controls motion and stores energy by harvesting energy from the environment.

In a preferred embodiment of the invention the bellows operates to augment an electric motor in the startup of an electric vehicle thereby reducing the load on the motor.

In a preferred embodiment of the invention the bellows operates in conjunction with an on-demand module Nitinol rotary system to store energy and provide power to a motion control or drive system.

In a preferred embodiment of the invention the bellows operates to control the startup of an automated device or robotic component.

In a preferred embodiment of the invention the bellows operates to collect heat from a solar concentrator cell and functions as an active cooling device or radiator.

In a preferred embodiment of the invention the bellows operates to collect heat from a solar concentrator cell and functions as an active cooling device or radiator circulating air over a heat sink.

In a preferred embodiment of the invention the bellows operates to collect heat from a solar concentrator heat sink to charge the bellows for energy storage.

In a preferred embodiment of the invention the bellows operates to collect heat from a solar concentrator cell that functions as a power drive device.

In a preferred embodiment of the invention the bellows operates to collect heat from a solar concentrator cell to power an active cooling element.

In a preferred embodiment of the invention the bellows operates to collect heat from a solar concentrator cell to power an active cooling element using a cooling loop within a heat sink plate.

In a preferred embodiment of the invention the bellows operates to collect waste heat from a mechanical, electrical or optical system to reconfigure itself for energy storage and power storage.

In a preferred embodiment of the invention the bellows operates to collect waste heat from a mechanical, electrical or optical system to power another device.

In a preferred embodiment of the invention the bellows operates to collect waste heat from a mechanical, electrical or optical system to store power.

In a preferred embodiment of the invention the bellows operates to collect waste heat from a mechanical, electrical or optical system to power a drive train or rotating generator or motor.

In a preferred embodiment of the invention the bellows operates to collect waste heat from a mechanical, electrical or optical system to augment a power drive system.

In a preferred embodiment of the invention the bellows operates to collect waste heat from its environment to store as energy or power.

In a preferred embodiment of the invention the bellows operates to collect heat from its environment to store as energy or power.

A preferred embodiment of the invention is an energy storage system for use in an apparatus comprising a mechanical bellows having an outer flexible material casing, wherein the outer flexible material casing operates to expand and contract to store and release energy; and wherein the outer flexible material casing includes one or more functional elements that operate as actuators for expanding and contracting the outer flexible material casing.

In a preferred embodiment of the invention the one or more functional elements are formed from shape memory material.

In a preferred embodiment of the invention the one or more functional elements are thermally coupled to a heat source that operates to activate the one or more functional elements.

In a preferred embodiment of the invention the bellows is coupled to one or more components that are activated when the outer flexible material casing expands or contracts.

In a preferred embodiment of the invention the mechanical bellows is formed from multiple smaller mechanical bellows.

In a preferred embodiment of the invention the heat source for activating the one or more functional elements is a heat pipe.

In a preferred embodiment of the invention the heat source for activating the one or more functional elements is a solar cell thermally connected to a heat sink.

In a preferred embodiment of the invention the heat source for activating the one or more functional elements is a heat sink having a solar concentrator lens that operates to direct and concentrate solar energy to the heat sink.

In a preferred embodiment of the invention the outer flexible material casing is removable such that it can be replaced by a different outer flexible material casing.

In a preferred embodiment of the invention at least one of the functional elements is in the form of a star pattern having a plurality of spires and which operates to control the force being applied to the outer flexible material casing by the functional element acting as an actuator to expand or contract by controlling power to all or some of the plurality of spires.

In a preferred embodiment of the invention the outer flexible material casing is thermally permeable allowing heat to penetrate the outer flexible material casing and absorbed by a heat sink or heat pipe.

In a preferred embodiment of the invention the outer flexible material casing includes support elements coupled to a magnetic rail system.

In a preferred embodiment of the invention the mechanical bellows operates to store energy and provide energy for use in a space vehicle.

In a preferred embodiment of the invention the mechanical bellows operates to store rotational energy produced by a wind generator and to provide energy for use by a generator or alternator.

In a preferred embodiment of the invention the mechanical bellows operates to store energy and provide energy for use in a powering a mechanical apparatus.

In another preferred embodiment of the invention the energy storage system is a bellows storage system having shaped memory material that operates to enhance the storage of energy of the energy storage system.

In another preferred embodiment of the invention the energy storage system is a combination of hydraulic and bellows storage systems.

In another preferred embodiment of the invention mechanical the energy storage system is a combination storage system comprising hydraulic, mechanical bellows and battery storage systems.

Another preferred embodiment of the invention is an energy storage system comprising a mechanical bellows coupled to a robotic structure for powering the operation of the robotic structure.

These and other features, aspects, and advantages of the present invention will become better understood with regard to the following description, appended claims, and accompanying drawings.

BRIEF DESCRIPTION OF THE DRAWINGS

To provide a more complete understanding of the present invention and further features and advantages thereof, reference is now made to the following description taken in conjunction with the accompanying drawings, in which:

FIG. 19 is a schematic illustration of another embodiment of the wind generator system having a housing comprising stands, rack mounting structures for equipment, and the like;

FIG. 43 is a schematic illustration of a functional element positioned at a specific area on the outer flexible material casing of the bellows;

FIG. 44 is a schematic illustration showing a partial view of a energy storage system, such as for use of a spacecraft, having a bellow and a power source or collector and an electric component attached to or coupled to the outer flexible material casing of the bellow which when expanded operates to extend the power source or collected and the electric component; and FIG. 45 is a schematic illustration showing a plurality of bellows linear arranged together to store and supply power.

BEST MODE FOR CARRYING OUT THE INVENTION

Figure 1:
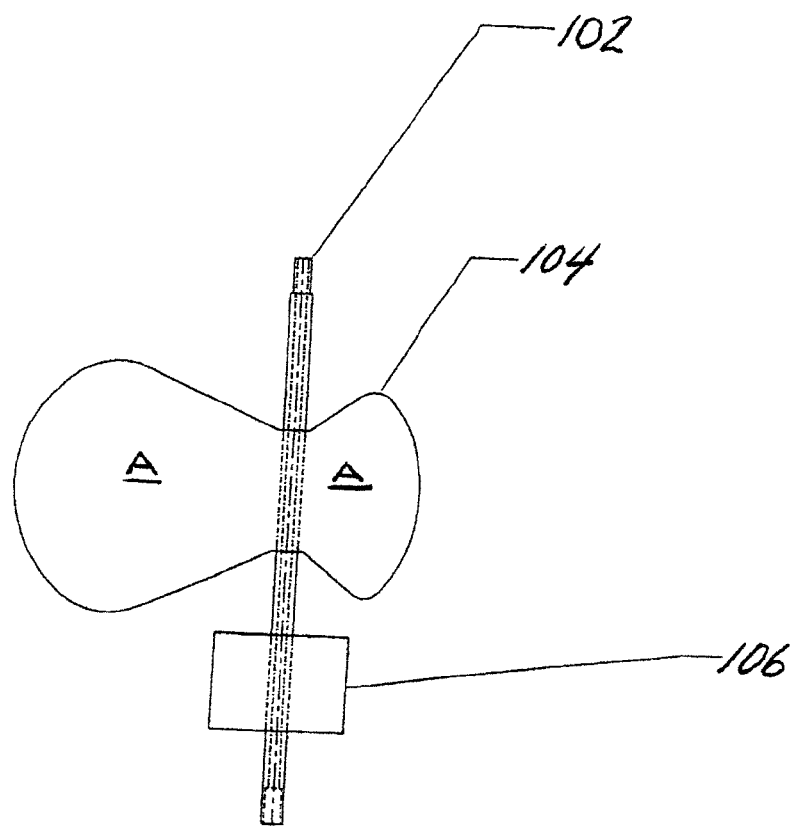
FIG. 1 is a schematic illustration of a portion of the wind generator system of the subject invention showing an end view of blades mounted to a drive shaft.

The present invention relates to low or small wind generator systems. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Wind Generator

Figure 2:
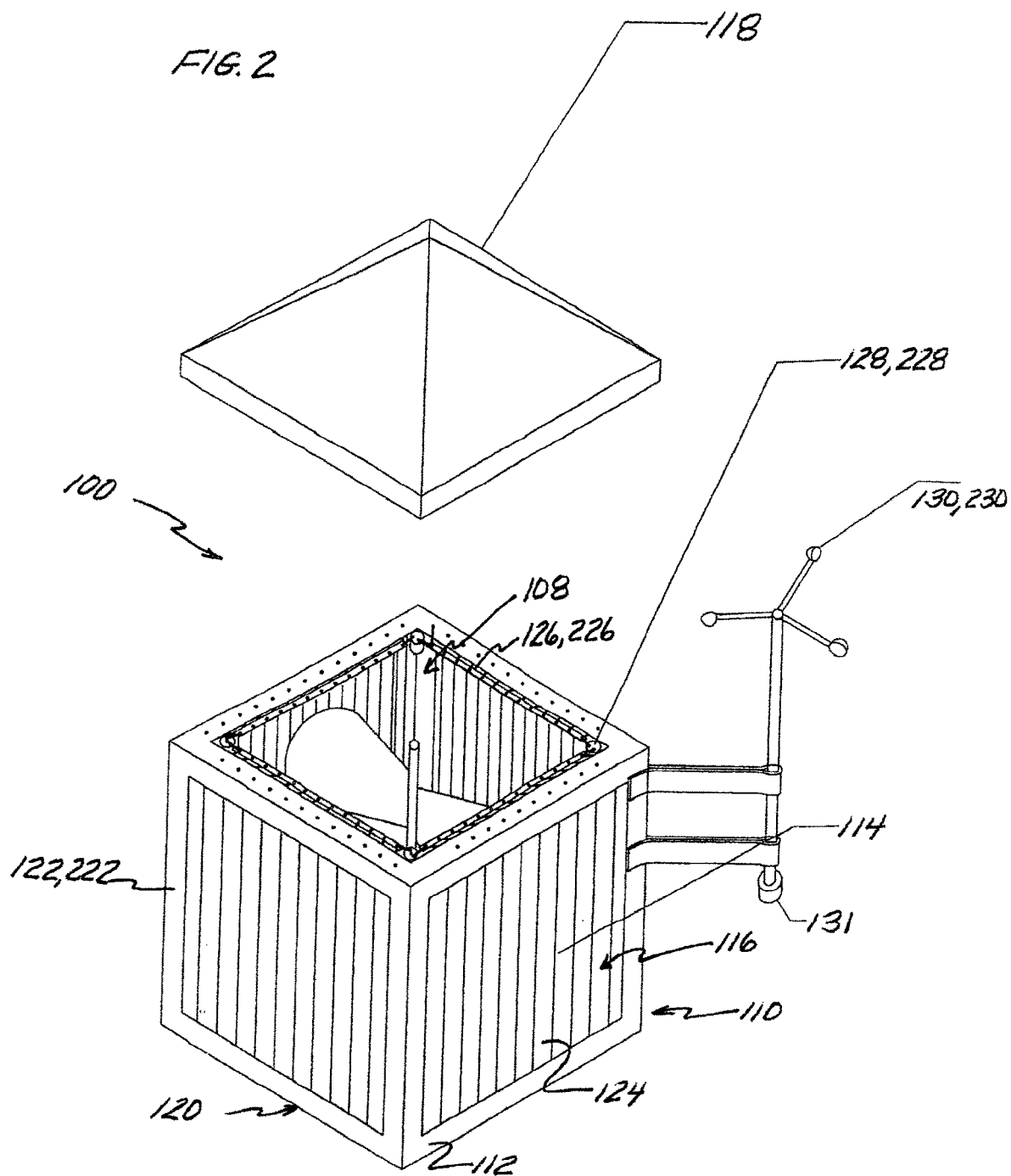
FIG. 2 is a perspective schematic partially exploded illustration of the wind generator system showing blades mounted to a drive shaft and enclosed within a housing.
Figure 3:
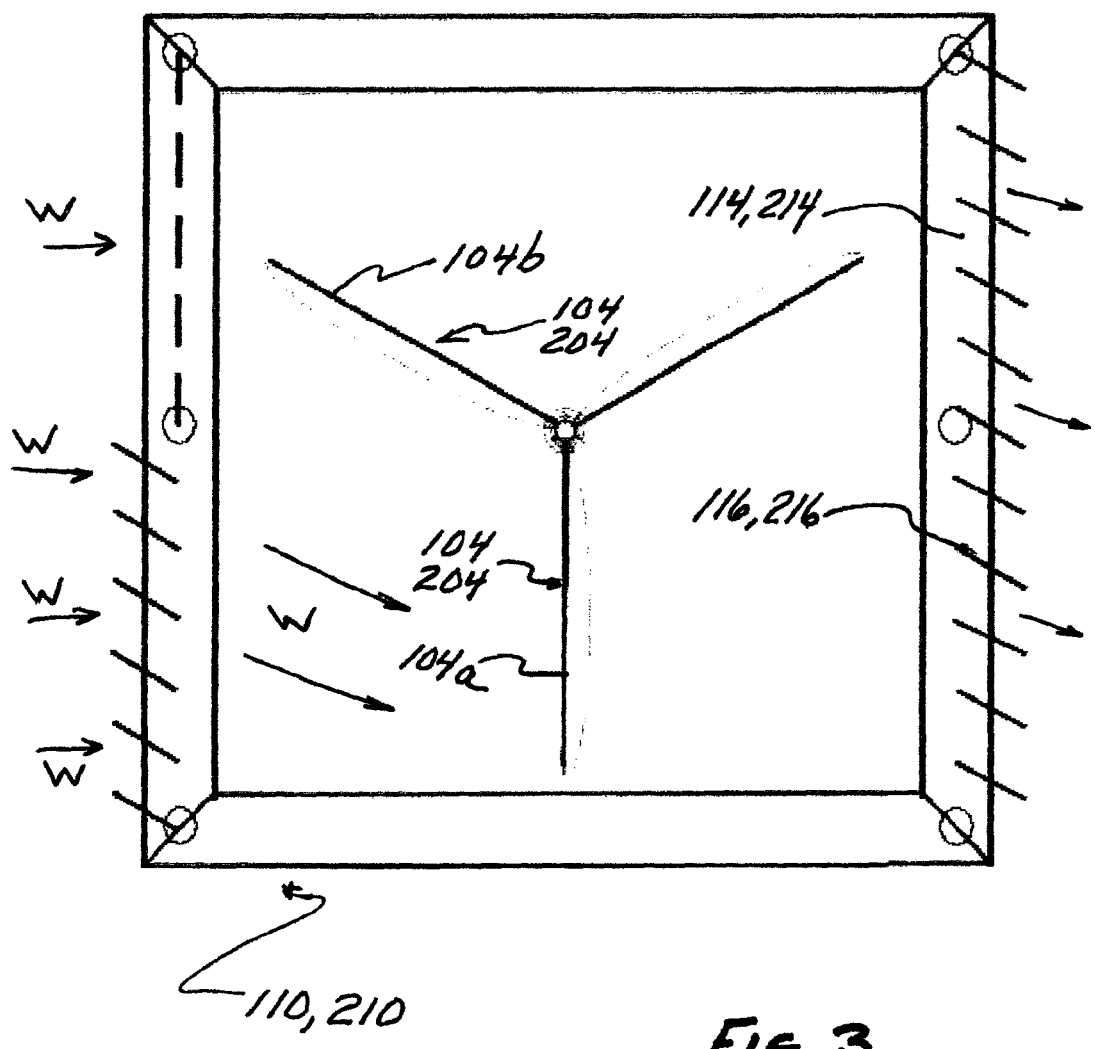
FIG. 3 is a schematic illustration showing wind being directed by the wind directional apparatus that operates to adjust wind speed and to channel wind into the housing through one or more of the openings, along a desired flow pathway towards the blades, and out of the housing through one or more of the openings.
Figure 4:
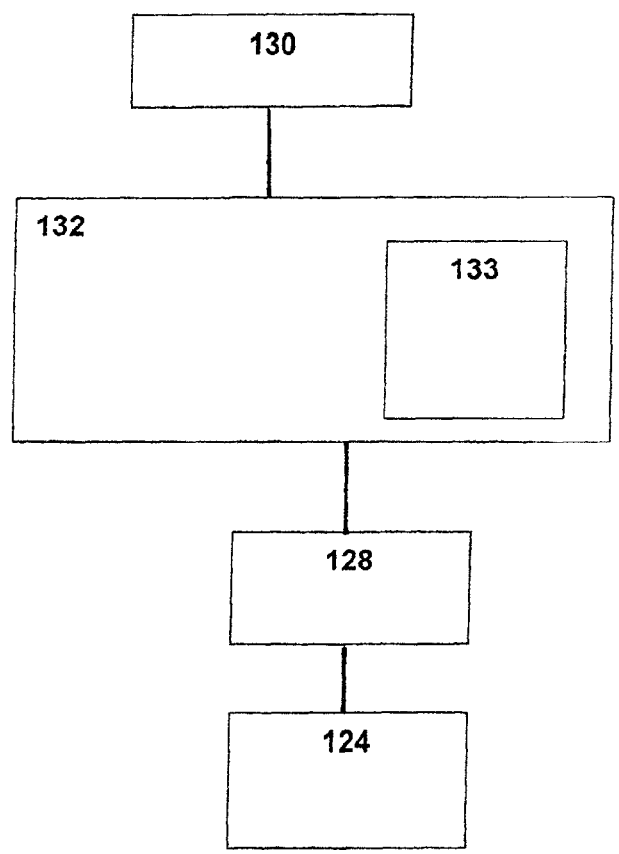
FIG. 4 is a schematic illustration showing the wind speed and direction sensor electrically coupled to a control apparatus having a microprocessor for receiving signals from the wind speed and direction sensor that determines and provides signals to a wind directional apparatus for directing airflow along a desired pathway to properly impinge the blades.

Referring to FIGS. 1 and 2, a preferred embodiment of the wind generator system, generally referred to as 100, is shown comprising a drive shaft 102 and one or more retreating blades 104a and one or more advancing blades 104b attached to and extending radially outwardly from the drive shaft 102. The drive shaft 102 is operationally coupled to a generator assembly 106 which operates to generate electrical power when actuated by rotation of the drive shaft 102. It should be understood that as used herein the term "generator" includes alternators. In a preferred embodiment as shown, the drive shaft 102 and blades 104 are enclosed within an inner chamber 108 of a housing 110. The housing 110 comprises a frame 112 having openings 114 wherein preferably each opening 114 has a wind directional apparatus 116 that operates to adjust wind speed and to channel wind W (FIG. 3) into the housing through one or more of the openings 114, which operate as air intakes that direct wind along a desired flow pathway towards the retreating blades 104a, and out of the housing 110 through one or more of the openings 114 that operate as wind exhausts. Preferably, the housing 110 is generally rectangular in shape having a top or roof 118, a base 120, and vertical sides 122. Preferably, at least one opening 112 is provided on each vertical side 122. In a preferred embodiment, as shown in FIG. 2, the wind directional apparatus 116 comprises a plurality of rotatable slats or louvers 124 that are operationally coupled to control rails 126 that are operated by one or more electric motor and horizontal control units 128 for rotating the slats 124 such as use of conventional bell cranks. It should be understood that the housing 110 is not limited to being rectangular in shape but may have a variety of geometries having various number of vertical sides. For an exemplary illustration, the housing can be formed in the shape of a pentagon. Mounted to the housing 110 is a wind speed and direction sensor or anemometer 130 that operates to detect and measure wind speed and direction at the location of the wind generator system 100. As illustrated in FIG. 4, the wind speed and direction sensor 130 is electrically coupled, such as by wire or by a wireless transmitter 131 (FIG. 2), such as shown, to a control apparatus 132 having a microprocessor 133 that receives signals from the wind speed and direction sensor 130 which then operates to determine and provide signals to the electric motor and control units 128 to rotate a plurality of the slats 124 into an open position for directing airflow (wind) along a desired pathway to properly impinge the retreating blades 104a and to close a plurality of the slats 124 into a closed position to prevent airflow (wind) from impinging upon advancing blades 104b. The control apparatus 132 further operates to provide signals to the electric motor and control units to rotate all of the slats 124 along the opposing vertical side 122 into an open position for allowing the airflow (wind) to exit the housing 110. It should now be apparent that by opening the slats 124 as described allows airflow (wind) to impinge on the retreating blades 104a to rotate the drive shaft 122 while minimizing the counter forces created by the airflow (wind) caused by impingement of the wind on the advancing blades 104b as well as creating a low pressure or suction that further pulls or draws the advancing blades 104b in the desired direction thereby increasing the operation and performance of the wind generator.

Aerodynamic Adjustment Element

Figure 5:
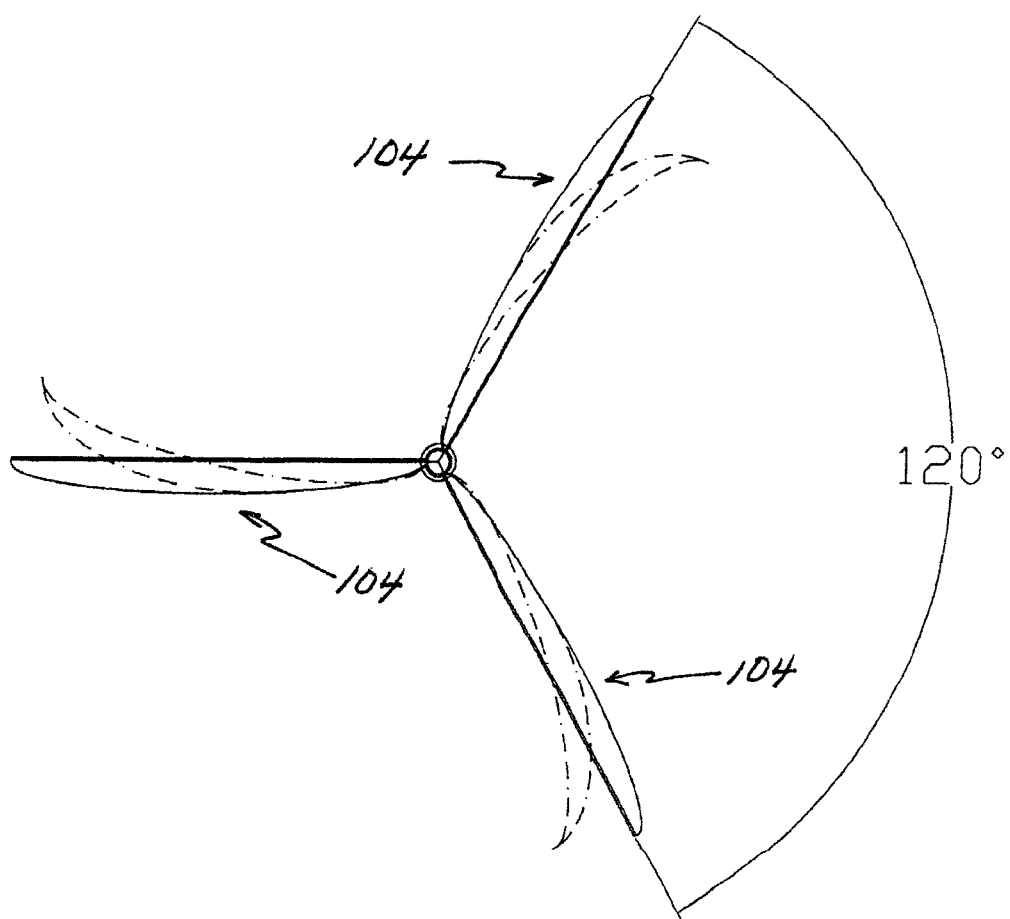
FIG. 5 is a top schematic view illustration showing blades having an aerodynamic adjustment element thereon that operates to increase or decrease the camber of the blades.
Figure 6:
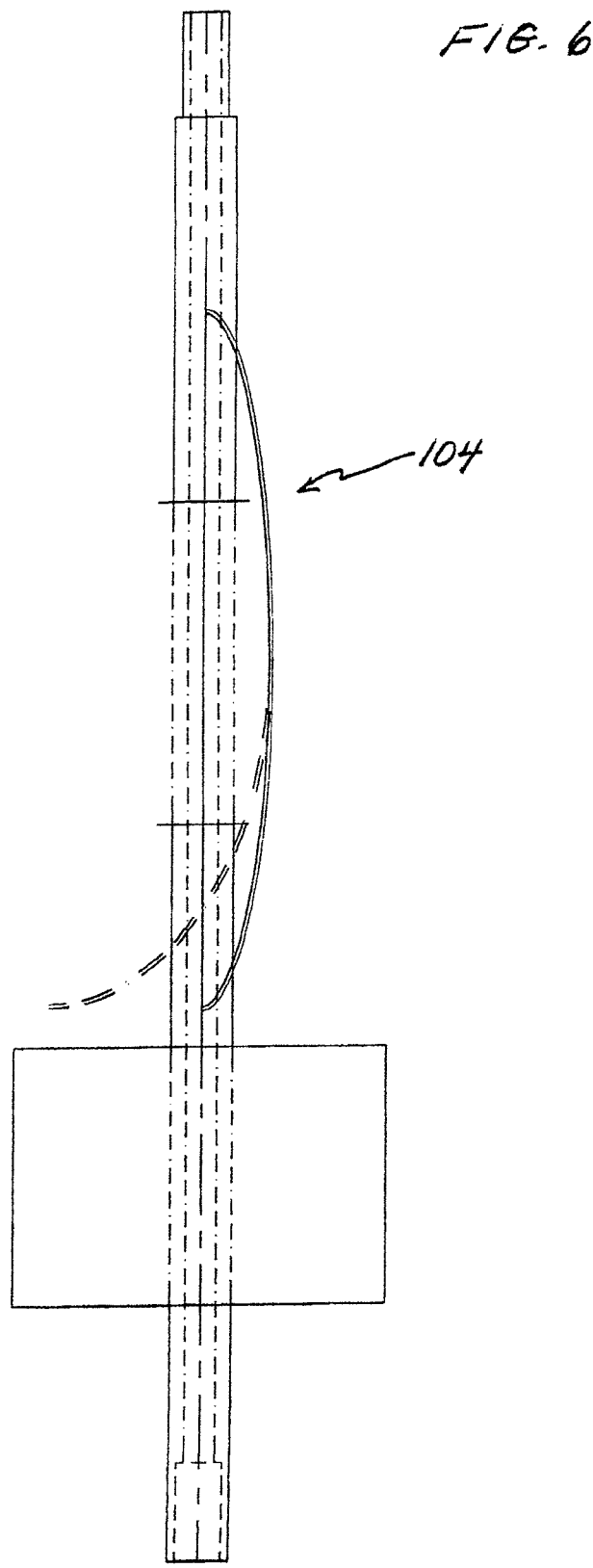
FIG. 6 is a side view illustration showing a portion of a drive shaft and a blade attached thereto and showing a blade being acted upon by the aerodynamic adjustment element of FIG. 5.
Figure 7:
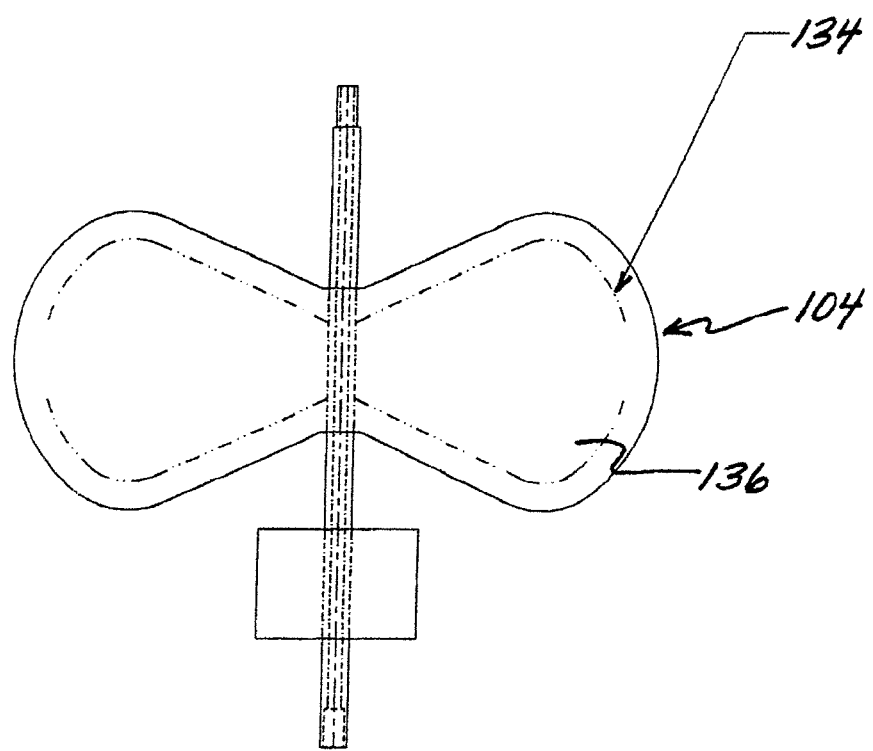
FIG. 7 is a schematic illustration showing blades having an aerodynamic adjustment element comprising a thin film material applied to a portion of one side of each blade.

Referring to FIG. 1, a preferred embodiment of the blades 104a, 104b is shown. Preferably each blade has a relatively large surface area A effective for harvesting lower-energy (low wind speed) wind being directed to the blades. Referring to FIGS. 5 and 6, another preferred embodiment of the blades 104a, 104b is shown whereby the blades include an aerodynamic adjustment element 134 (FIGS. 7 and 8) for adjusting the aerodynamic characteristic of each of the blades. In a preferred embodiment, as shown in FIG. 7, the aerodynamic adjustment element 134 comprises a thin film material or wire 136, such as a shaped memory material or functional material, that operates to increase or decrease the camber of the blades 104a, 104b (as shown in FIGS. 5 and 6) for adjusting the aerodynamic characteristic of the blade under a variety of wind speeds. It is known that simple contraction of certain thin film materials can be accomplished such as by running electrical current through a functional material such as carbon fibers on a polyimide sheet. In a preferred embodiment, the thin film material 136 is formed from a shaped memory material, such as Nitinol (NiTi) which is a shaped memory alloy having nearly equivalent amounts of nickel and titanium. The physical and mechanical properties of a shaped memory material, such as Nitinol are dependent on its crystalline structure. For example, the Nitinol crystal structure is very dynamic and highly heat sensitive and when it is deformed in the martensite phase, the crystalline structure is not damaged. Instead, the crystal structure transforms moving in a singular crystalline direction. When heated the material returns to the memory or austenite phase, to a state of less stress. The austenite phase is the phase above transition temperature. The transition temperature will vary according to the material composition. Most Nitinol alloys, for example, have transition temperatures between 70-130° C. with tensile strength 100,000 psi, melting point of 1,250° C., and resistance 1.25 ohms per inch/0.006-inch wire. In a preferred embodiment, the particular Nitinol alloy found to be suitable is known as FLEXINOL, commercially available by Dynalloy Inc. of Costa Mesa, California.

Figure 8:
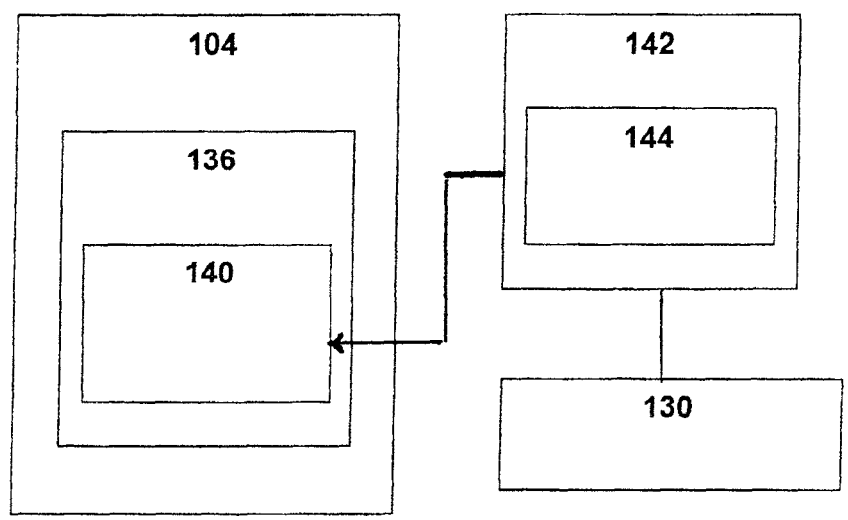
FIG. 8 is a schematic illustration showing the interaction between a blade control unit and a resistant circuit for heating of the film material of FIG. 7 to cause the bending of the blade to increase or decrease its camber thereby adjusting its aerodynamic characteristic.

Preferably, as stated above, the aerodynamic adjustment element 134 may be in the form of an embedded wire, thin film or a metallic coating. Referring to FIG. 7, in a preferred embodiment the aerodynamic adjustment element 134 is shown as a thin film material 136, such as a Nitinol, applied to a portion of one side of each blade 104*a*, 104*b*. As shown, the blade is in its normal operating configuration. Upon heating of the thin film material 136, or an embedded wire, such as by application of electric current through a resistant circuit 140 (FIG. 8) within or along the thin film material 136, the thin film material 136 contracts, as described above, causing the bending of the blade 104*a*, 104*b* to increase or decrease its camber thereby adjusting its aerodynamic characteristic (FIGS. 5 and 6). Referring to FIG. 8, in order to control the amount of current through the resistant circuit 140 for properly adjusting the aerodynamic characteristic of the blade, the wing generator system 100 further comprises a blade control unit 142. In a preferred embodiment, the blade control unit 142 includes a fuzzy logic microprocessor or controller 144 that receives wind speed input from the wind speed and direction sensor or anemometer 130 and uses such information for controlling the amount of electric current, thus heating, or allowing the thin film material 136 (or embedded wire) formed from the shape memory alloy to expand or contract to bend and place the blade 104*a*, 104*b* into a desired aerodynamic configuration.

Figure 9:
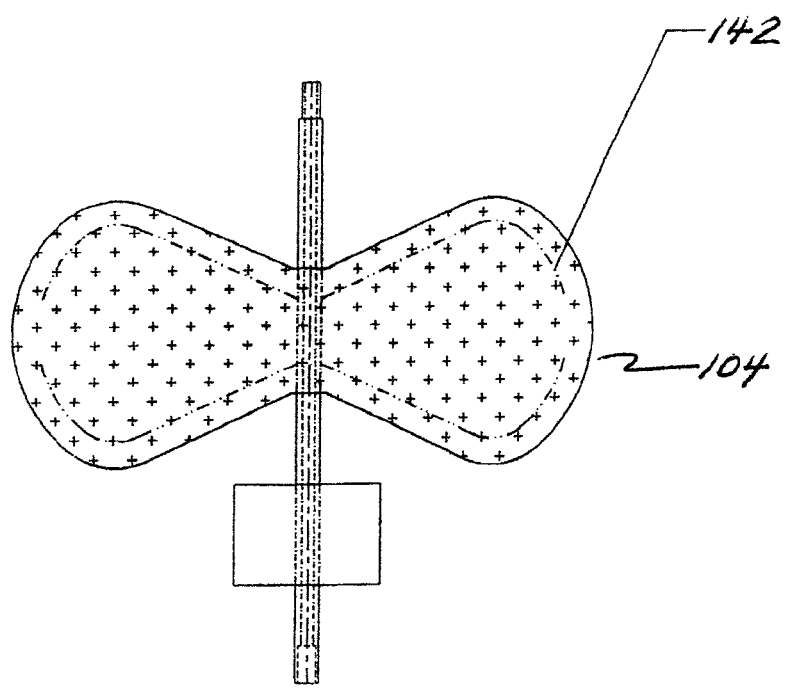
FIG. 9 is a schematic illustration showing another preferred embodiment of a blade control unit for properly adjusting of the aerodynamic characteristic of the blades comprising a neural network.

In another preferred embodiment of the invention, as illustrated in FIG. 9, the blade control unit 142 for properly adjusting of the aerodynamic characteristic of the blades 104*a*, 104*b* is a neural network (or parallel distributed processing elements (often referred to as nodes, neurons, processing elements, unites)) that work together to control the proper electric current to the resistant circuit 140. It should be understood that the artificial neural network (functional structure) is deposited or embedded onto the surface of the blades 104*a*, 104*b* and operates for information processing and aerodynamic geometry control of the blades. Referring to FIG. 8, the methodology of the blade control unit is shown whereby signals generated by the wind speed and direction sensor 130 are inputted into the blade control unit 142.

Figure 10:
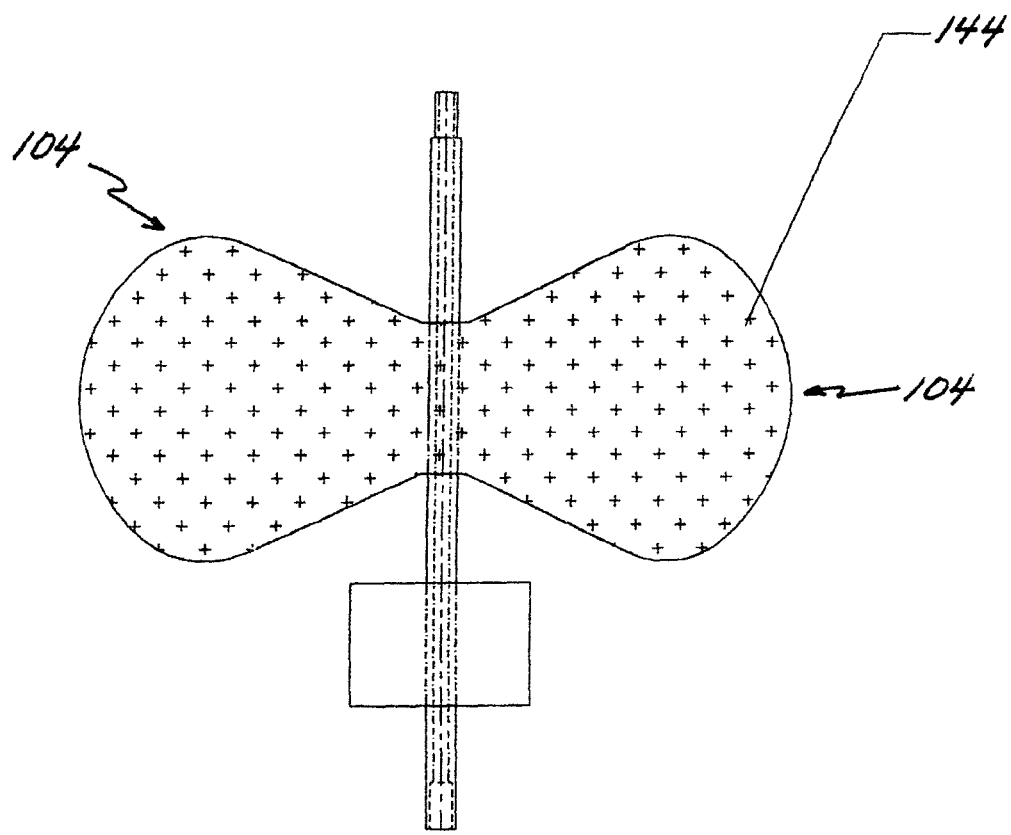
FIG. 10 is a schematic illustration showing blades having a piezo electric material coating applied to one or both sides of the blades.

Referring to FIG. 10, another preferred embodiment of the invention is shown whereby the blades 104*a*, 104*b* have a light activated photovoltaic film or nanofilm 144 applied to one or both sides of the blades. In another preferred embodiment of the invention, one or more portions of the housing 110 (FIG. 2) may be provided with such a light activated photovoltaic film or nanofilm (not shown). Preferably, the photovoltaic films or nanofilms are activated by light in the infrared range. One such nanofilm film has been developed at the University of Toronto having cells of approximately 4 nm and is photoactive in the infrared range of the light spectrum. Using films that are activated by infrared light permits higher power output with less solar radiation, such as during a cloudy day, than with standard ultraviolet (UV) photovoltaic systems. In another preferred embodiment the blades 104*a*, 104*b* or housing 110 (FIG. 2) may comprise piezo electric material coatings to augment power generation of the wind generator system as well as providing wind speed information by measuring the dynamic pressure of the wind against the surface of the blade.

Figure 11:
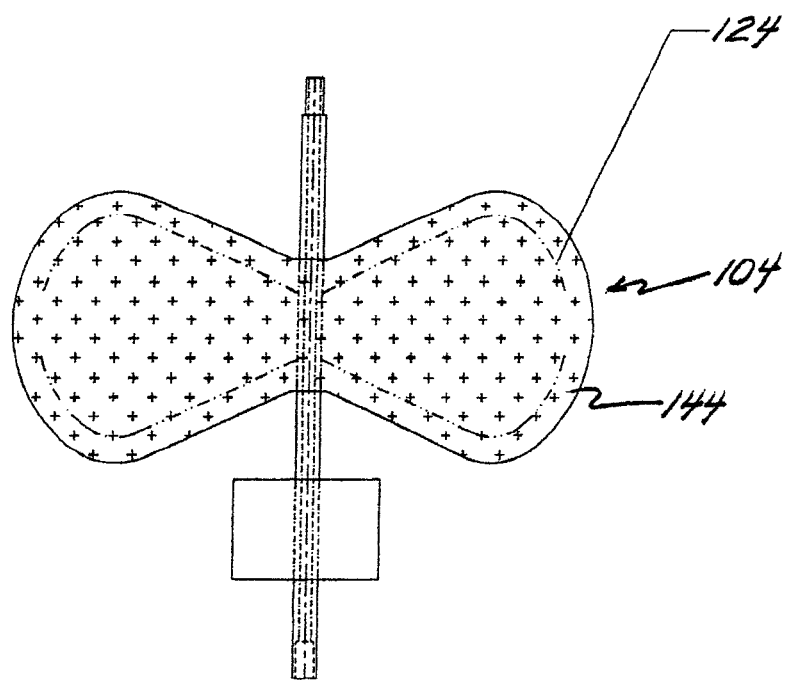
FIG. 11 is a schematic illustration showing blades having both an aerodynamic adjustment element and a piezo electric material coating applied thereto.

In another preferred embodiment, as illustrated in FIG. 11, the blades 104*a*, 104*b* comprises both the aerodynamic adjustment element 124 and the photovoltaic film 144, as described above.

Performance Monitor

Figure 12:
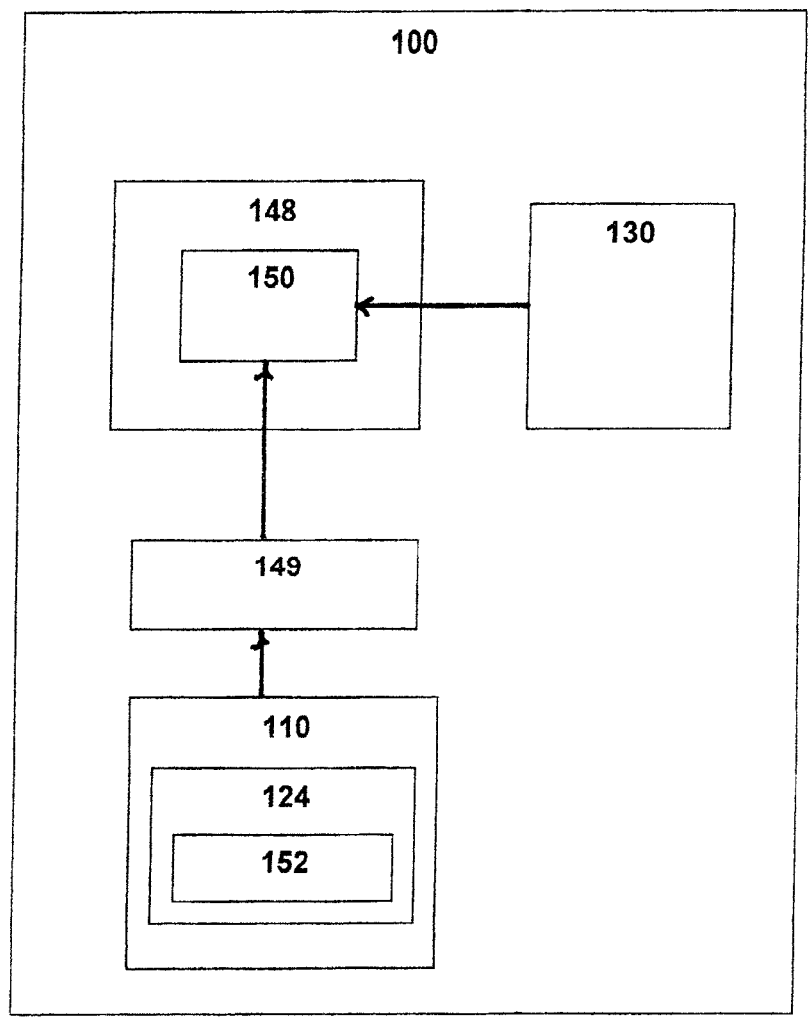
FIG. 12 is a schematic illustration showing a performance monitor for monitoring the performance and efficiency of the wind generator system.

In another preferred embodiment of the invention, as shown in FIG. 12, the wind generator system 100 comprises a performance monitor 148 for monitoring the performance and efficiency of the wind generator system 100 Preferably, the performance monitor 148 comprises a microprocessor 150 effective for receiving signals from the wind speed and direction sensor 130 as well as receiving signals from other component sensors 149 effective for transmitting information from the components comprising the wind generator system 100. In a preferred embodiment, the performance monitor 148 operates to monitor the electrical power output of the wind generator system 100. In another preferred embodiment, the performance monitor 148 comprises a sensor 152 positioned on one or more of the rotatable slats or louvers 124 of housing 110 and operates to sense the actual rotational movement of the slat or louver 124 (FIG. 2). Such information can then be analyzed by the microprocessor 150 to determine if the proper rotational movement of the slat or louver 124 is being performed. It should now be understood that other sensors can be utilized for providing signals to the microprocessor 150 that can be utilized by the microprocessor for determining the efficiency or performance of the various operational components comprising the wind generator system 100.

In another preferred embodiment, the microprocessor 150 can operate to monitor the total power output of the wind generator system 100 to the rotational speed of the blades to determine the health and operation performance of the system 100. For an exemplary illustration, if the power output being generated by the wind generator system is below the level typically generated for the particular wind speed, the system components can be evaluated to determine which particular component is not operating efficiently and the component can be replaced thereby bringing the system efficiency back to its typical level. It should be understood that additional conventional sensors can be incorporated into the wind generator system to monitor the operational efficiency of various components and monitored by the microprocessor. Further, it should now be understood that the microprocessor can be coupled to a conventional transmitter (such as a wireless radio transmitter, the Internet, or other communication system) for transmitting operational data to a remote monitoring device. In this way, individual systems can be monitored as well as for use in obtaining information for use in maintenance and in determining the need for performance enhancement modifications.

Configuration

Figure 13:
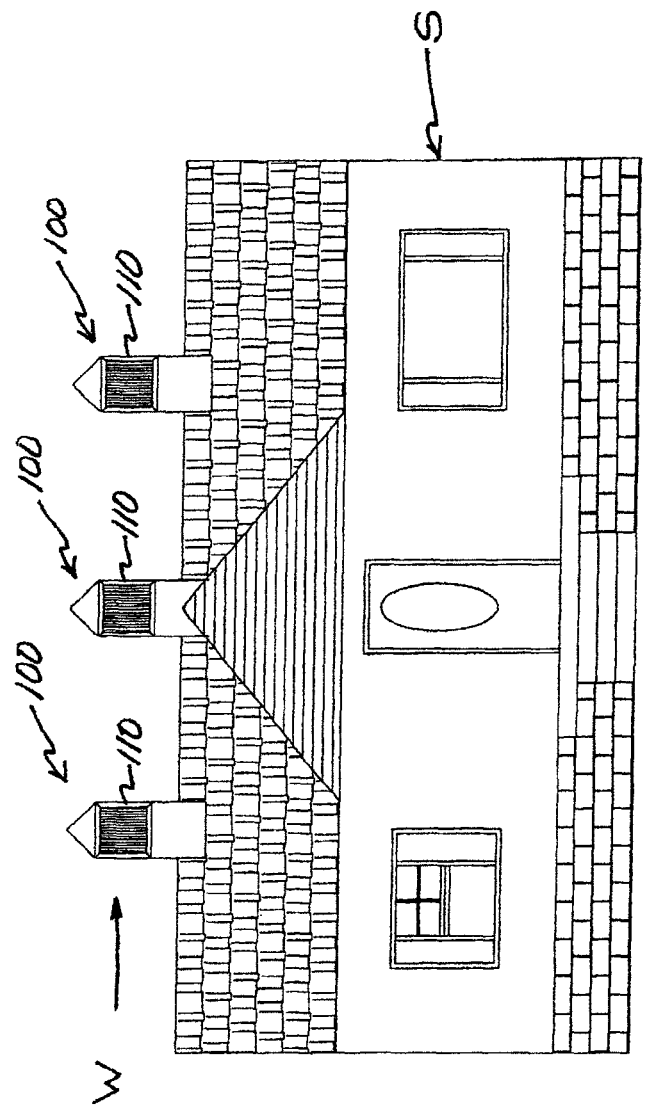
FIG. 13 is a schematic illustration showing a wind generator system attached to a structure, such as the roof of a building.

Referring to FIG. 13, one or more wind generator systems 100 are shown mounted to a structure S, such as a wall, roof, platform, or the like and are can also be incorporated architecturally into the structure S. In addition, as should now be understood, that the wind generator system 100 having a housing 110 described above reduces operational noise levels and reduces the likelihood of injury to wildlife, such as birds. As shown, wind W, is blowing in a first direction, the wind speed and direction is monitored and sensed using the wind speed and direction sensor 130 (FIG. 2). The wind speed and direction sensor 130 transmits a signal to the control apparatus 132 such that the microprocessor 133 (FIG. 4) receives the signal and determines and provides signals to the electric motor and control units 128 to rotate the slats 124a to the desired position for directing airflow along a desired pathway to properly impinge the retreating blades 104a (FIG. 2) and for blocking the wind W from impinging upon the advancing blades 104b. It should now be apparent that if the wind speed and direction sensor 130 detects wind speed or a wind gust greater than the safe or operational wind speed for the particular wind generator system the system operates such that the slats 124 will rotate to slow down and/or redirect the wind so that the velocity of the wind is within acceptable operating parameters. It should also be apparent that in another preferred embodiment of the invention the aerodynamic adjustment element 134 (FIGS. 7, 8 and 9) can be used to adjust the aerodynamic characteristics of the blades to allow them to accommodate the high wind speed. It should be apparent that unlike many prior art systems, the wind generator system of the subject application can operate under a variety of wind conditions from small wind to high wind conditions without the need of mechanical braking systems or gearing systems.

Figure 14:
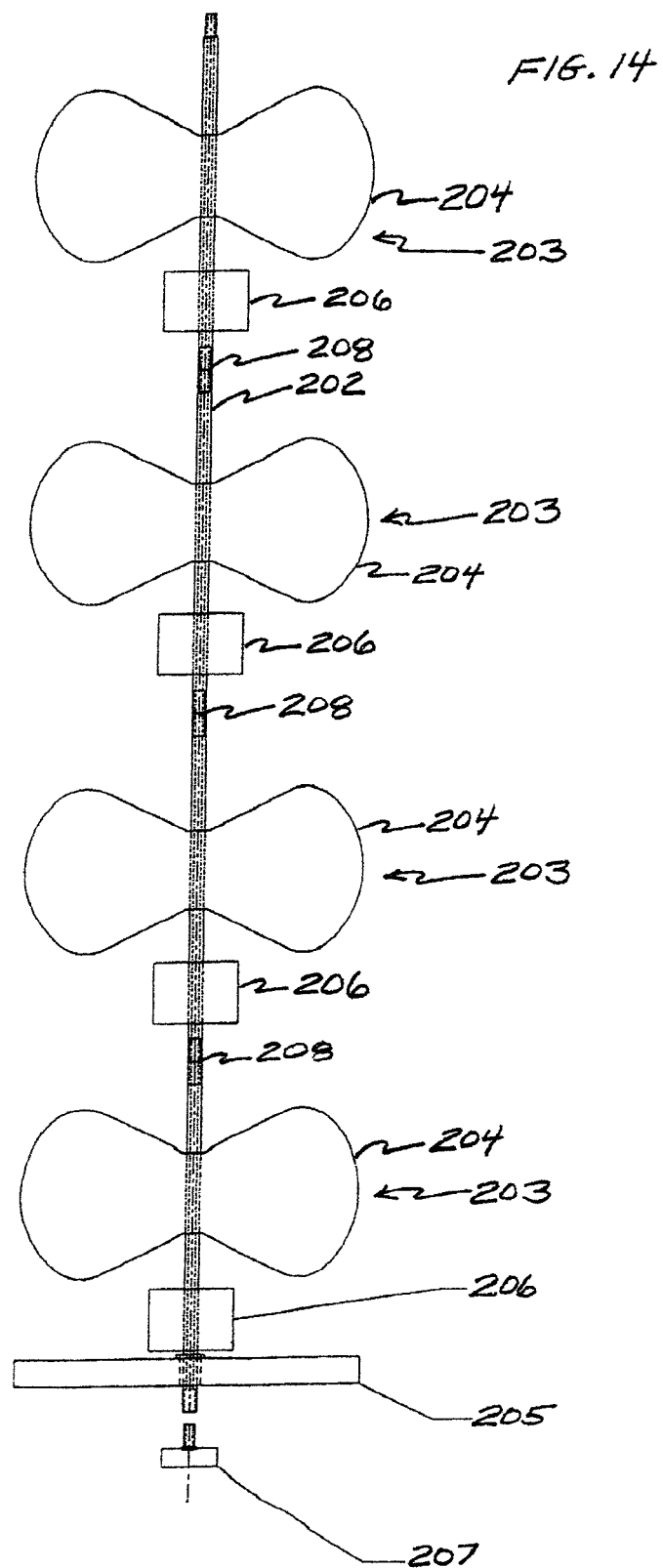
FIG. 14 is a schematic illustration showing another preferred embodiment of the invention showing the wind generator system comprising a plurality of aligned or stacked blades mounted to a drive shaft.

Referring to FIG. 14, another preferred embodiment of the invention is shown whereby the wind generator system comprises a single drive shaft 202 or a series of shafts mounted together such as by couplings 208, as shown, and one or more stages of blades 203, each stage 203 having one or more blades 204 (retreating blades 204a and advancing blades 204b) attached to and extend radially outwardly from the drive shaft 202. It should be understood that the blade stages can be arranged in a horizontal or vertical arrangement. The drive shaft 202 is operationally coupled to a generator assembly 206 or a plurality of generator assemblies 206 (as shown) which operate to generate electrical power when actuated by rotation of the drive shaft 202. Preferably, the drive shaft 202 is formed from a light aircraft grade rolled or extruded aluminum and is tubular having an inner channel 203 that provides a chase for allowing a power bus, control cables and the like to travel to the various stages, controls, and actuators and other similar electronic devices. The drive shaft 202 is supported by frame 205 and one or more bearing assemblies 207. It should be understood that the individual stages can be modular and assembled together by use of a rotating coupling placed in series of the individual stages, as shown. It should also be understood that the individual generators can be mounted in series to the drive shaft or the drive shaft can be coupled to a single generator.

Figure 15:
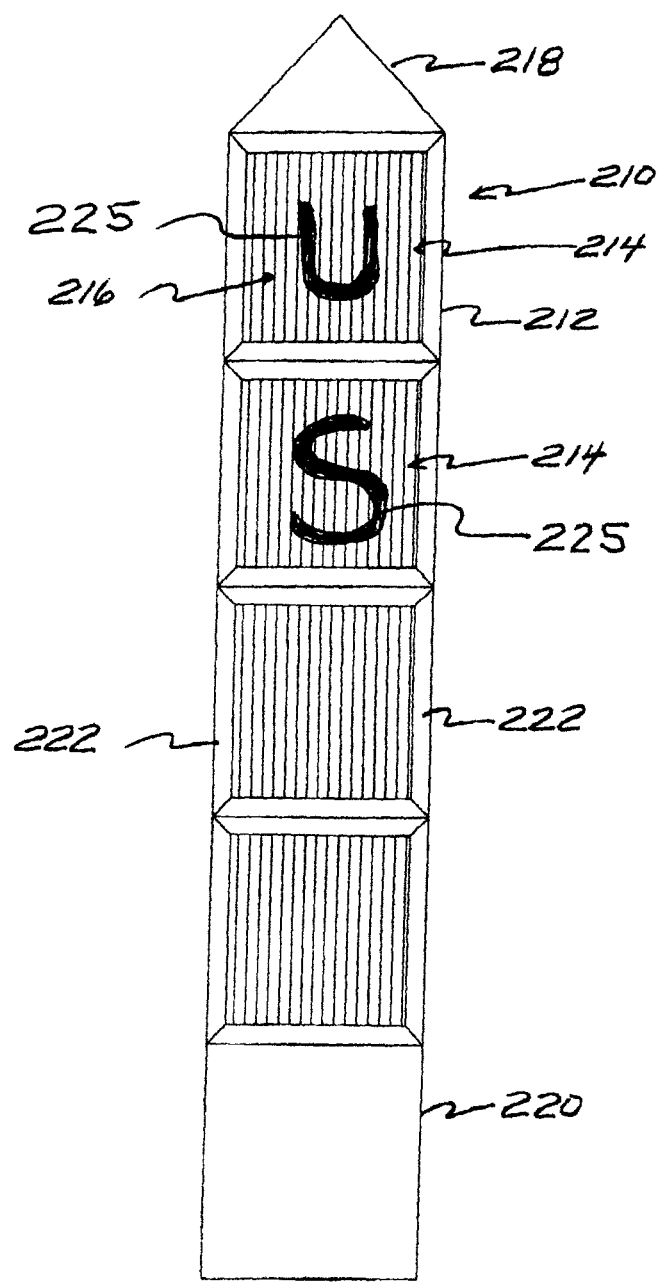
FIG. 15 is a schematic illustration of the wind generator system of FIG. 14 showing the blades and shaft within a housing.

In another preferred embodiment, as shown in FIGS. 14 and 15, the drive shaft 202 and blades 204 are enclosed within a housing 210. Referring to FIG. 15, as shown the housing 210 comprises a frame 212 having openings 214 wherein each opening 214 has a wind directional apparatus 216 that operates to adjust wind speed and to channel the wind W (FIG. 5) into along a desired flow pathway towards the plurality of advancing blades 204a and for blocking the wind W from impinging on the advancing blades 204b. Preferably, the housing 210 is generally rectangular in shape having a top or roof 218 and base 220, and vertical sides 222. Preferably, at least one opening 214 is provided on each vertical side 222. In a preferred embodiment, as shown in FIG. 2, the wind directional apparatus 216 comprises a plurality of rotatable slats or louvers 224 that are operationally coupled to control rails 226 that are operated by one or more electric motor and control units 228 for rotating the slats 224. It should be understood that the housing 210 is not limited to being rectangular in shape but may have a variety of geometries having various number of vertical sides. For an exemplary illustration, the housing can be formed in the shape of a pentagon. Mounted to the housing 210 is a wind speed and direction sensor or anemometer 230 that operates to detect and measure wind speed and direction. As previously described, the wind speed and direction sensor 230 is electrically coupled to a control apparatus having a microprocessor that receives signals from the wind speed and direction sensor 230 which then determines and provides signals to the electric motor and control units 228 to rotate the slats 224 to the desired position for directing airflow along a desired pathway to properly impinge the retreating blades 204a and to block the wind (airflow) from impinging the advancing blades 204b.

Figure 16:
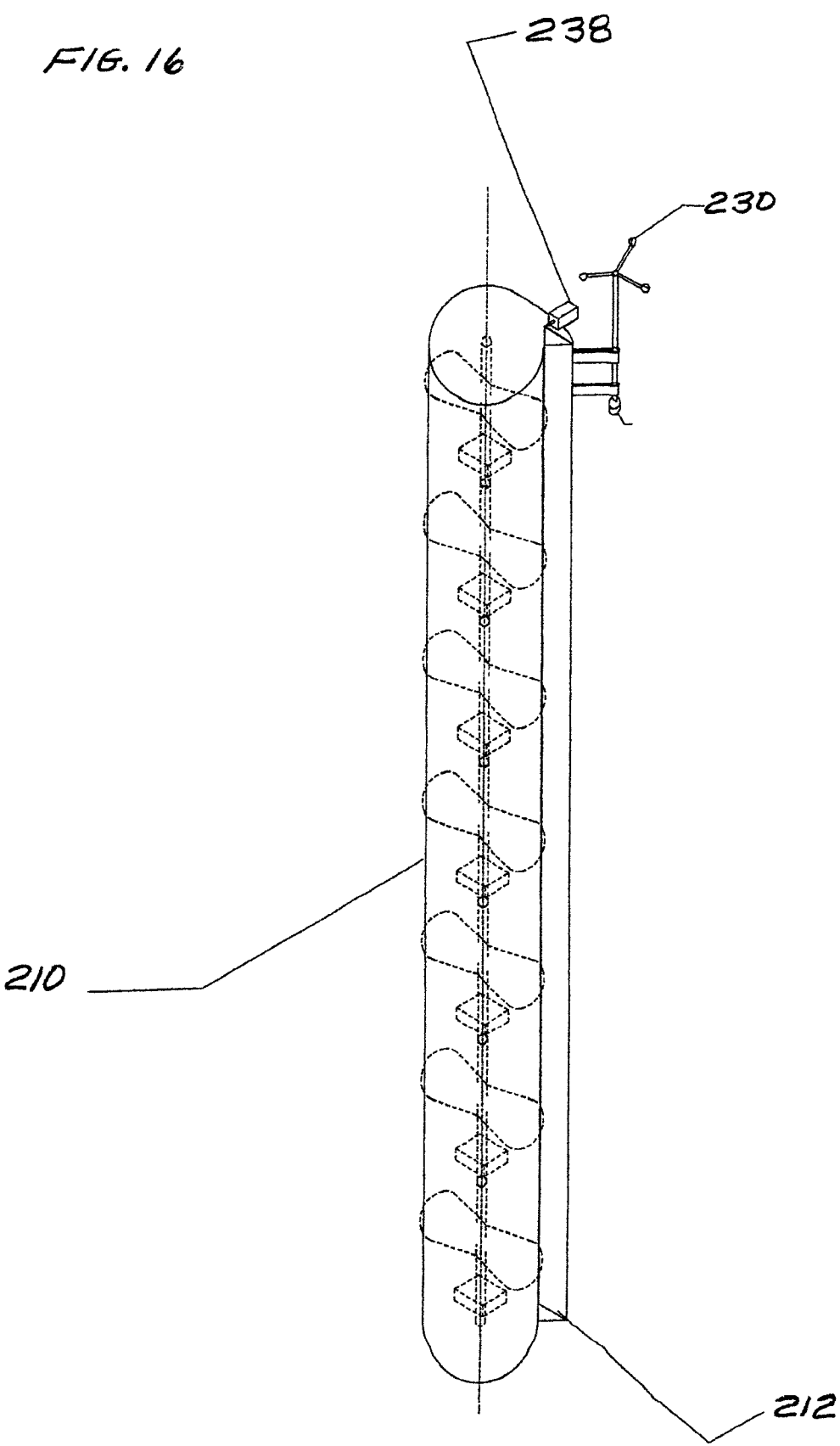
FIG. 16 is a schematic illustration showing another preferred embodiment of the invention showing a plurality of aligned or stacked blade stages enclosed within a housing having a wind intake ramp.
Figure 17:
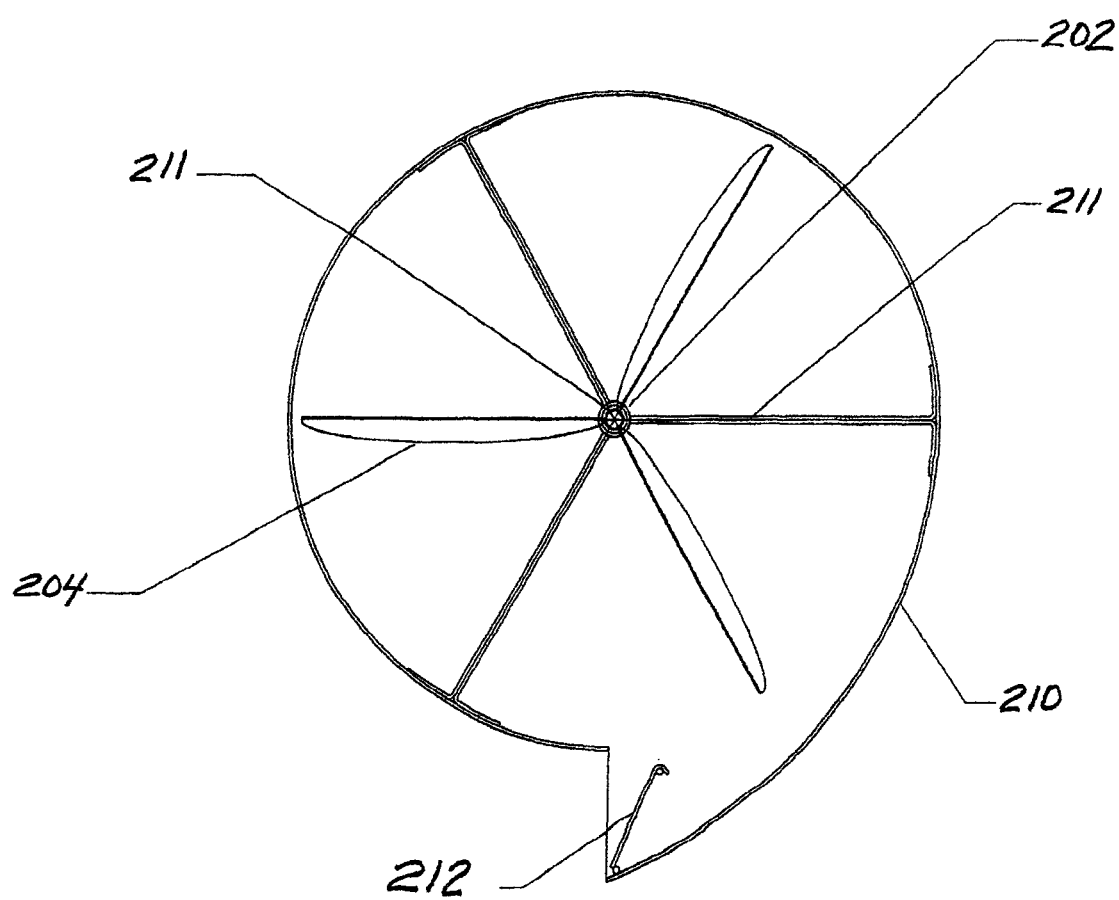
FIG. 17 is a schematic illustration showing a top view of the wind generator system of FIG. 16.
Figure 18:
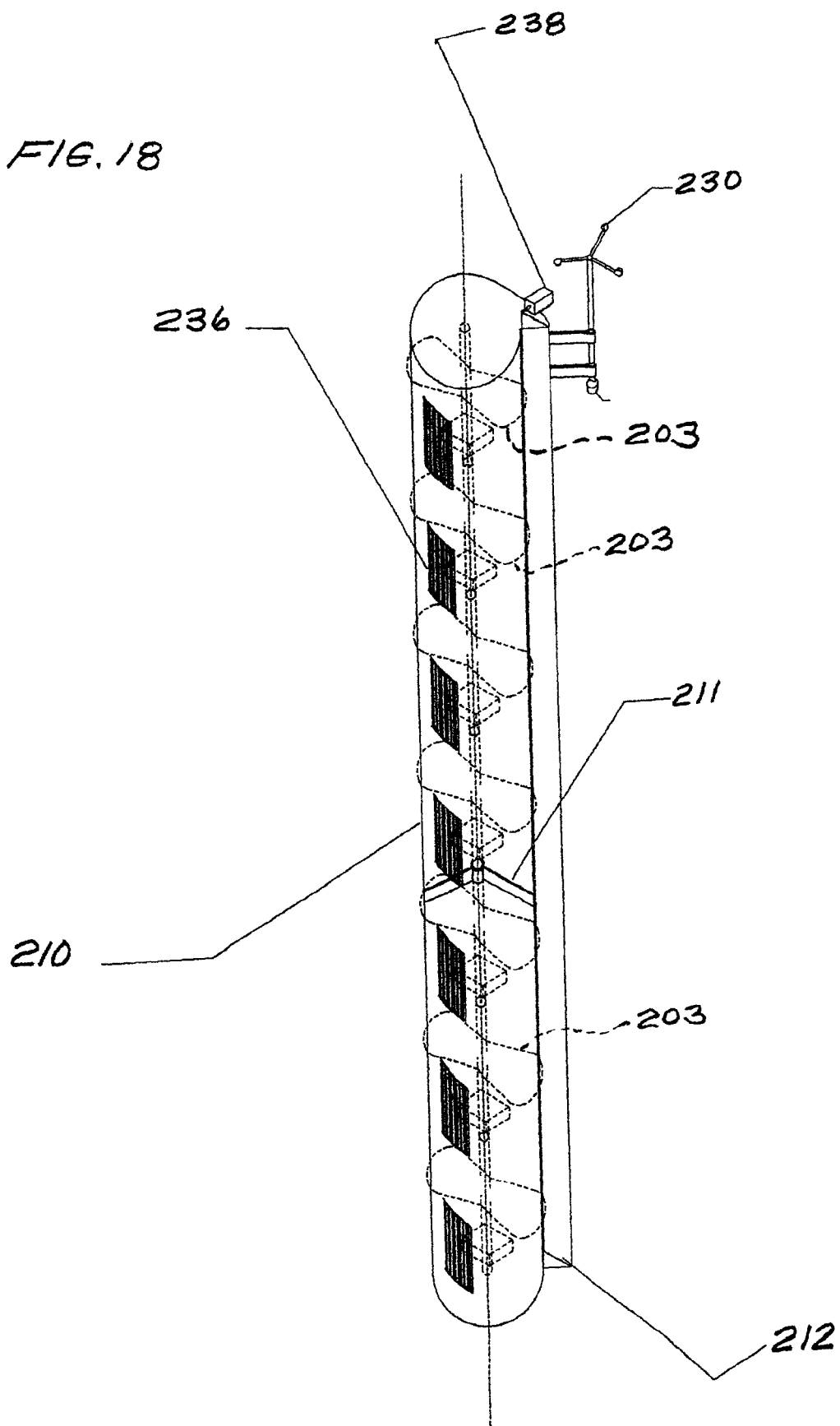
FIG. 18 is a schematic illustration of the wind generator system of FIG. 16 showing wind exhaust openings.

In another preferred embodiment as illustrated in FIGS. 16, 17 and 18, a plurality of blade stages 203 connected together by a common drive shaft 202 are enclosed within a housing 210 having supports 211 and which is rotatably mounted such that the housing can rotate in response to wind direction to optimize the wind entering through intake opening or ramp 212. In a preferred embodiment the intake opening 212 in the housing 210 operates as a wind intake or scoop and cooperates with one or more exhaust openings 236 that operate to expel air to optimize air flow through the housing as well as to provide pressure to rotate the wind generator system. Preferably, the intake opening 212 can be opened or closed by use of a linear displacement potentiometer 238 that cooperates with the wind speed and direction sensor 230 and a control apparatus, such as that previously described, to increase or decrease the size of the intake opening 212 and to properly direct the wind to the retreating blades and block wind (airflow) from impinging against the advancing blades.

Figure 19:
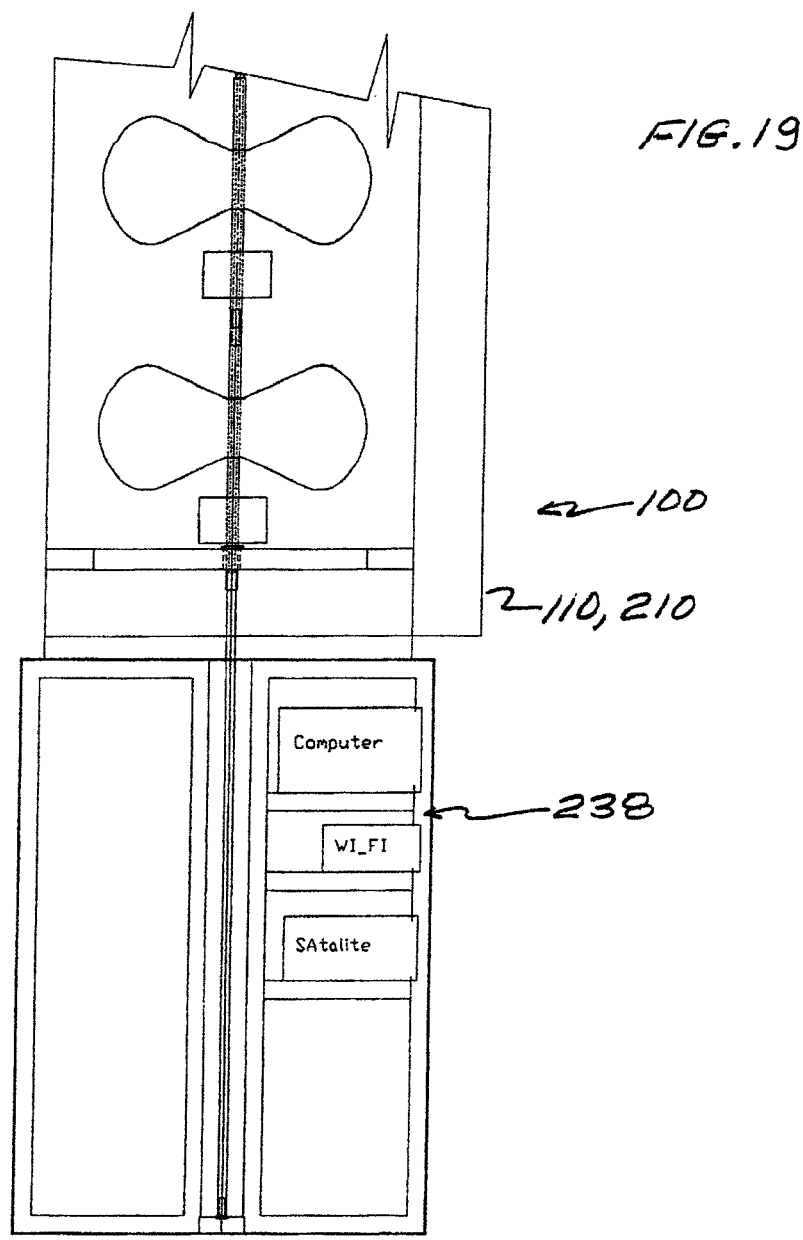

Referring to FIG. 19, in a preferred embodiment of the invention the wind generator system can be used to provide electric power for various applications. As an exemplary illustration, such systems can be mounted to a structure or be portable for emergency and/or remote location use. As shown in FIG. 19, a preferred embodiment of the wind generator system 100 is illustrated whereby the housing 110, 210, includes stand, rack mounting structures 238 for equipment, such as electrical equipment, battery systems, and the like. In another preferred embodiment, a portion of the exhaust airflow can be diverted, such as by vents or stators, to provide cooling for such equipment.

Energy Enhancement

Figure 20:
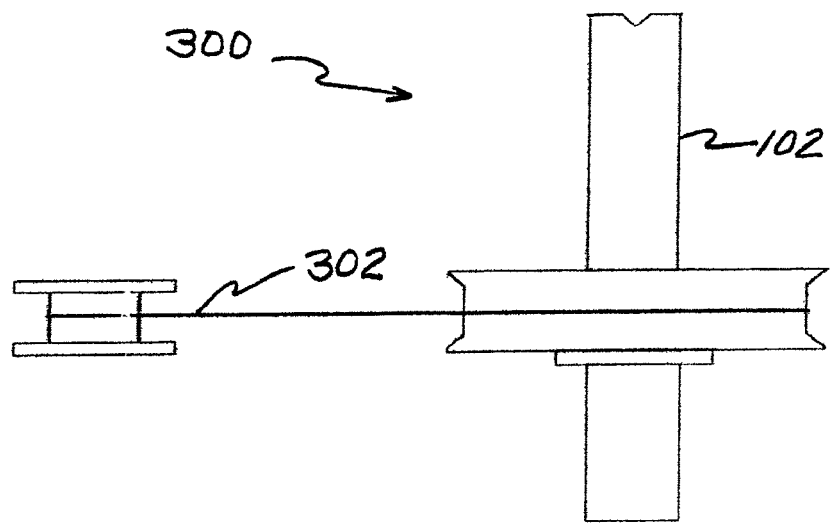
FIG. 20 is a schematic illustration of another preferred embodiment of the invention showing an energy enhancer element for increasing the rotation of the drive shaft.
Figure 21:
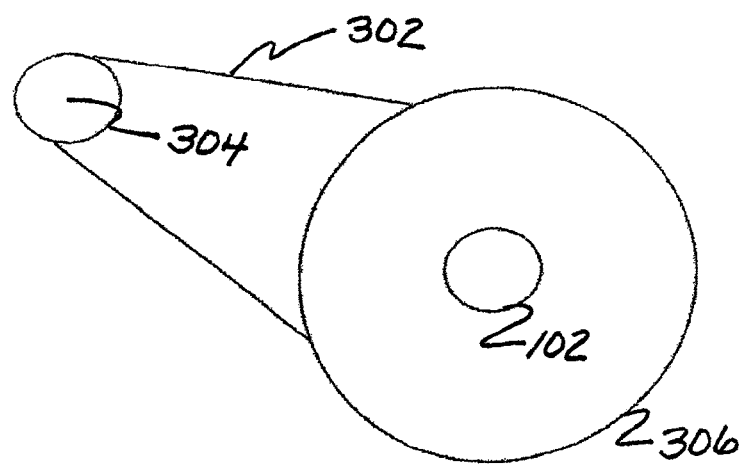
FIG. 21 is a schematic illustration showing the top view of the energy enhancer element of FIG. 20.

Referring to FIGS. 20 and 21, another preferred embodiment of the invention comprises an energy enhancer element 300 in the form of an endless wire or band 302 making a loop and formed from a shaped memory material, such as Nitinol (NiTi). The use of the energy enhancer element 300 provides on-demand power through the use of a shaped memory material (SMM). SMM's generally function through some form of electrical stimulation or heating, usually ohmic heating induced by an electric current. The heating of a SMM wire such as Nitinol or other shaped memory materials such as memory polymers or functional materials, may also be used to induce rotational motional in the on-demand energy enhancer element wire or bands that causes the wire or band to return to its original geometry through its metallurgical or physical properties.

In an application, NiTi wire or wires or NiTi coated thin film belt, provides rotational motion which then turns a shaft attached at one end of a spindle assembly rotating an electrical generator such as a permanent magnet DC generator, electrical alternator, electrical motor, servo, solenoid or similar device. In a preferred embodiment, as shown, a spindle assembly 312 comprising a wire or band 302 forming an endless loop is placed around a first rotating wheel 304, which is electrically coupled to a heating circuit 305, and a second larger wheel 306 coupled to the drive shaft 102. When increased power is required, such as during low wind or no wind conditions, the heating circuit 305 is activated causing the first rotating wheel 304 to heat. A portion of the wire or band 302 that is coupled with, such as by direct contact with the first rotating wheel 304 is thereby heated bringing the memory shaped material above its transition temperature thereby creating a temperature differential along the wire or band 302 thereby shortening the heated side of the wire or band 302 causing rotational force to be applied to the second larger wheel 306 and drive shaft 102.

Many types of power activated devices including automated systems rely on individual electric motors, servos and alternators (or generators) to operate. The operation of these systems requires the use of electrical power. In preferred embodiments of the invention the energy enhancer element 300 operates to provide such on-demand power for a variety of power activated devices 308 such as, but not limited to, small vehicles, construction equipment, space craft, remotely operated vehicles, and a variety of other power activated devices 308 that require individual generators, alternators, electric motors, servos and related systems for operation. It should be understood that by integrating the energy enhancer element 300 into such applications can provide on-demand power as well as increase power or back-up power to such devices.

In a preferred embodiment of the invention, the energy enhancer element 300 is used for providing electrical power to power activated devices 308 such as, but not limited to, those used for orthopedic assistive devices and prosthetics, wheel chairs, robotic systems and personal rapid transit systems (PRT) vehicles. Such energy enhancer elements 300 provide on-demand power with low-cost, low-power consumption, and reliable consumable component.

Figure 24:
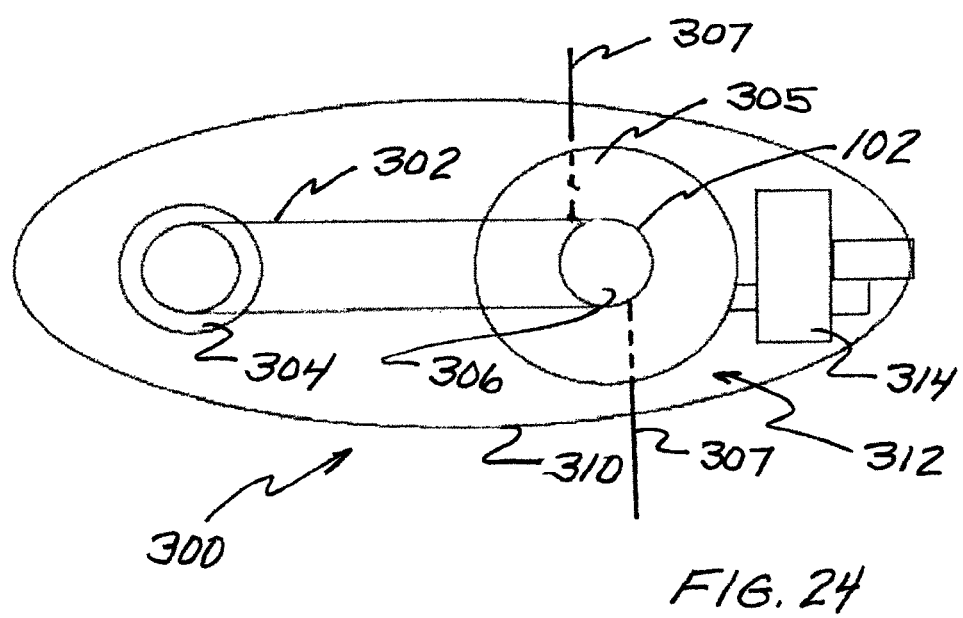
FIG. 24 is a schematic illustration of another embodiment of the energy enhancer element of FIG. 20, the energy enhancer element is in the form of a canister having a housing with a spindle assembly with a rotating wire or band formed from a memory shaped material adapted to drive a power activated device.

In a preferred embodiment of the invention, as illustrated in FIG. 24, the energy enhancer element 300 is shown in the form of a cartridge comprising a round, oval or square housing 310 enclosing a spindle assembly 312. Preferably a wire or band 302 forming an endless loop is placed around a first rotating wheel 304, which is electrically or thermally coupled to an electrical circuit or heating device 305, and a second larger wheel 306 coupled to the drive shaft 102 that is coupled to an electrical producing device 314, such as a generator, alternator, electric motor or other similar power producing device. It should now be understood that the wire or band 302 can also be used to provide electric current through electrical connectors 307 on the spindle assembly 312 that in turn induces current into the wire or band 302 causing ohmic heating thereby inducing rotational motion of the wire or band 302 and in turn causing rotation of drive shaft 102 which is coupled to the electrical circuit or heating device 305. It should also be understood that the electrical circuit or heating device 305 can create ohmic heating created such as by use of a battery or other electric source such as a wind turbine, micro-hydro generator, solar cell, solar heating systems, or other such electrical source.

Figure 25:
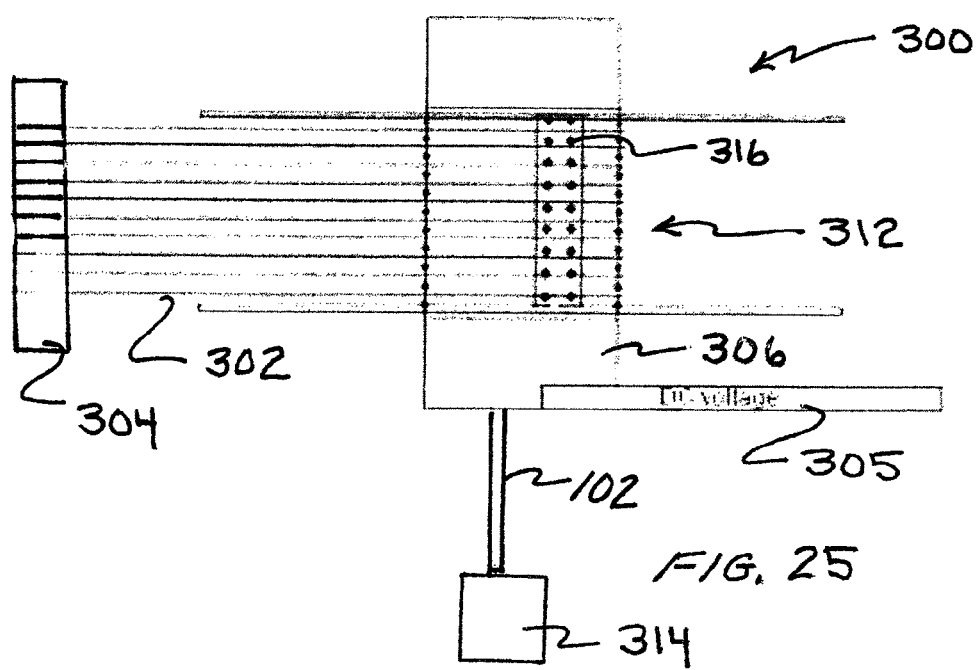
FIG. 25 is a schematic illustration of the energy enhancer element of FIG. 24 having a plurality of wires or bands creating a continuous loop formed from a memory shaped material.

In another preferred embodiment, as shown in FIG. 25, the energy enhancer element 300 comprises a spindle assembly 312 having a plurality of wires or bands 302 forming one or more endless loops placed around a first rotating wheel 304 which is electrically or thermally coupled to an electrical circuit or heating device 305, and a second wheel 306 coupled to the drive shaft 102 that is coupled to an electric producing device 314, such as a generator, alternator, electric motor or other similar power producing device. As shown, the spindle assembly 312 further includes guides 316 that operate to maintain the separation of the plurality of wire or bands 302. It should now be apparent that the use of a plurality of wires or bands 302 can be used to increase the power output of the energy enhancer element 300. It should also be apparent that the electrical circuit or heating device 305 can be controlled, such as by conventional switches, to heat one or more of the wires or bands 302 thereby allowing the amount of power being generated to be adjusted.

Figure 26:
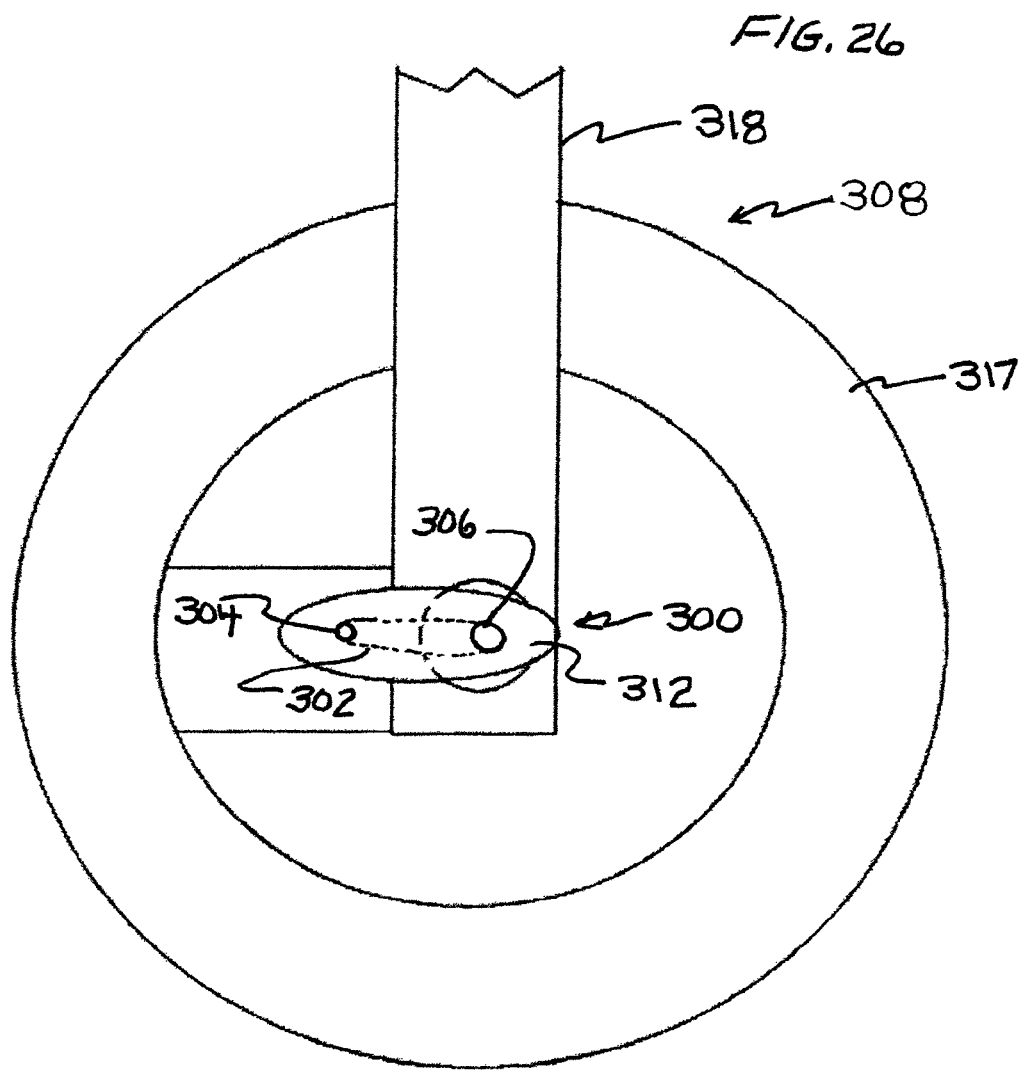
FIG. 26 is a schematic illustration of an exemplarily illustration showing the energy enhancement element of FIG. 24 or FIG. 25 mounted to a wheel assembly adapted to drive a power activated device such as a wheel.

Referring to FIG. 26, is an exemplary illustration of the energy enhancer element 300 is installed such that it is coupled to an electric motor, servo, or other electric producing device 314 such as by a shaft to provide back-up, increase power, and/or on-demand power to rotate a wheel 317 mounted to a wheel assembly 318 such as that used for a vehicle, instrument, robot, or other device 308. As shown, the spindle assembly 312 of the energy enhancer element 300 comprises one or more wires or bands 302 forming an endless loop rotating around a first rotating wheel 304 and a second wheel 306 as previously described. The second rotating wheel 306 is coupled to the drive shaft 102 of the wheel 317.

Figure 27:
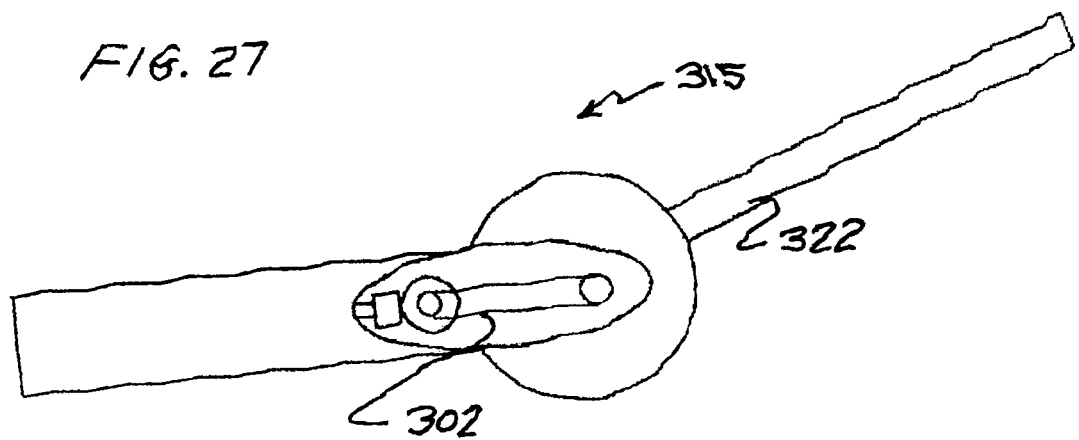
FIG. 27 is a schematic illustration of another exemplarily illustration showing the energy enhancement element of FIG. 24 or FIG. 25 adapted to drive a power activated device such as those utilized for satellite operations.
Figure 28:
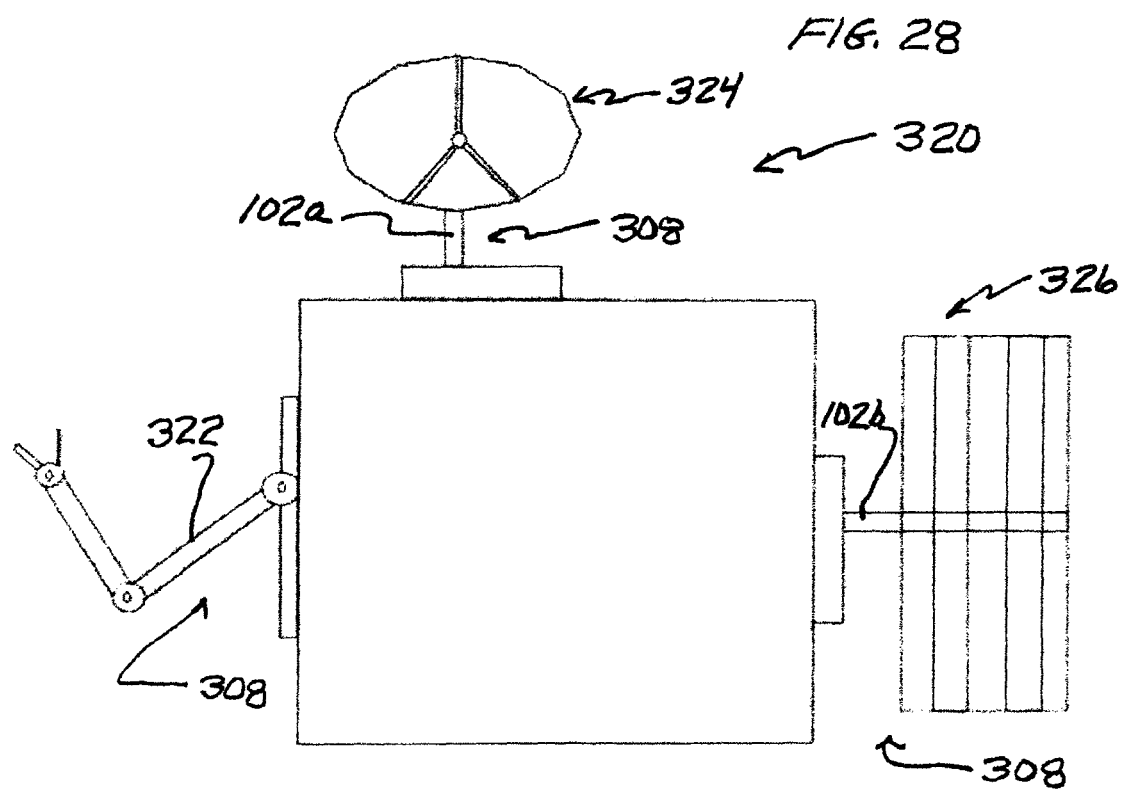
FIG. 28 is a schematic illustration of the energy enhancement element of FIG. 24 coupled to a servo mechanism for operating a power activated device.
Figure 29:
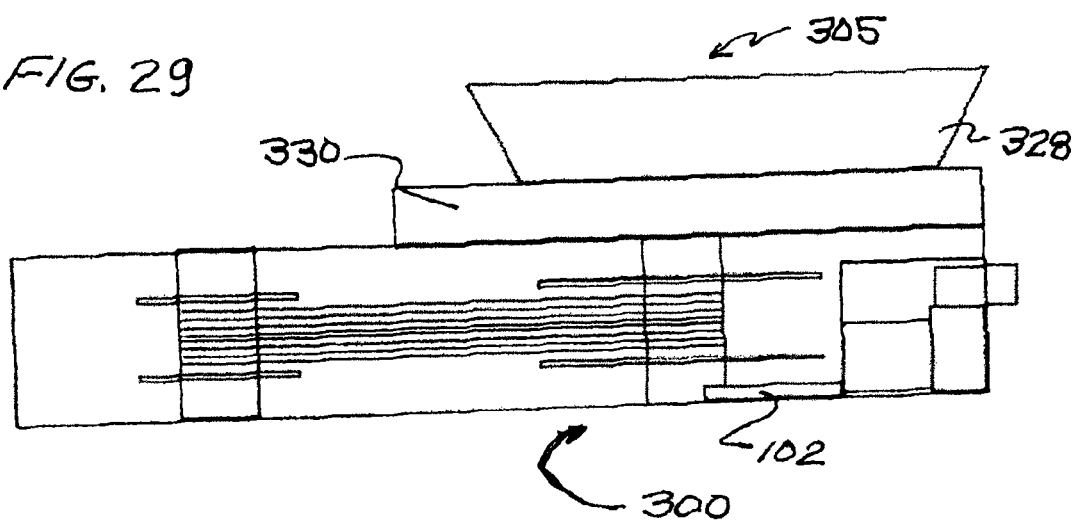
FIG. 29 is a schematic illustration of the energy enhancement element of FIG. 27 showing a solar radiation heat source.

In another exemplarily illustration of the energy enhancer element 300 is shown in FIGS. 27 and 28 whereby the power activated devices 308 comprises various components that may be utilized for a satellite 320 such as used in space. As shown, in one preferred embodiment the energy enhancer element 300 is coupled to a servo mechanism 315 that is conventionally coupled to a robotic arm 322. In another embodiment the energy enhancer element 300 is coupled to an activated device 308 such as an antenna 324 mounted to a drive shaft 102a. The energy enhancer element 300 is coupled to the drive shaft 102a in a manner as previously described. In another preferred embodiment the energy enhancer element 300 is coupled to an activated device 308 such as a solar cell array 326 conventionally mounted to a drive shaft 102b. The energy enhancer element 300 is coupled to the drive shaft 102b in a manner as previously described such that rotation of the loop formed by wires or bands 302 operates to rotate drive shaft 102b that operates to perform one or more of the functions of the power activated device 308. It should now be apparent that the energy enhancer element 300 can provide power or enhanced power to operate a variety of power activated devices. Referring to FIG. 29, the energy enhancer element 300 further includes an electrical circuit or heating device 305 comprising a lens 328 thermally coupled to heat sink 330. In a preferred embodiment the lens 328 operates to direct thermal energy, such as solar radiation, to heat the heat sink 330. The heat sink is thermally coupled to the spindle assembly 312 to operate the energy enhancer element 300 as previously described.

Energy Storage System

The energy storage system of the subject invention, can be configured to support multifunctional operations and applications. Such an application is as a space satellite and solar sail. It is known in the art that the thin film deposition of nickel will create a device on a substrate or within an engineered substrate that when excited by a laser or coherent light source, it will produce electrical current. This electrical current can then in turn operate the bellows of the energy storage system as a mechanical device driving geometries that vary surface area for greater propulsion in the case of a solar sail, greater cooling in the case of a satellite radiator, or increasing the resident generation of electricity to power other devices.

In a preferred embodiment, the bellows is integrated as a louver assembly for a window whereby the effect of a clear bellows material with a polarized coating will close when struck by a laser or coherent light source. This is a security shade that automatically deploys for a variety of vehicles. An electromagnetic ring magnet can be integrated into the bellows as a support as well as a device for inducing an impulse function that reduces response time and increases force in NiTi elements and devices. The bellows can include support elements that are connected to Magnetic bearings to stabilize mechanical movement, reduce friction of the system during operation of the bellows.

In a preferred embodiment Piezo electric material is integrated into the outer flexible material casing of the bellows to produce or generate electricity and augment any other generation source, i.e. generator set connected to the bellows and driven by a piston or a gear or gear assembly. Fabric or film processed with a specific mask using a laser, electron beam or linear accelerator or similar energetic source to process the fabric or film inducing specific variation in mechanical, physical or chemical properties of the material used to construct the outer flexible material casing of the bellows. The mask will create geometric variation in the patterns produced within the processed fabric or film to create the particular mechanical, physical or chemical identity desired.

The energy storage system of the subject invention is effective for use with multifunctional lightweight devices requiring low power and energy harvesting operation for energy storage, motorless motion including high force power drive applications, thermal management, heat harvesting to increase energy production, augment energy production and reduce thermal loads on a variety of devices and systems. Such as for use to augment electric drive and electrical generating systems for electric vehicles.

The energy storage system of the subject invention can also act as a self-powered variable geometry radiator for a variety of thermal control functions for spacecraft, solar concentrators, aircraft, engines, battery stacks and related devices and vehicles. The energy storage system can also operate to provide plasma control to reduce or vary dielectric character and ionization of spacecraft. Further, the bellows of the energy storage system can be compressed on one side to increase tension within the bellows assembly and creating a "fan" type shape to exploit the temperature differential in environmental applications such as solar heating, environmental energy harvesting and direct attachment to a heat sink or bar. The temperature different causes the bellows to rock as an Accordion bellows or Trevelyon Rocker which powers an electrical generator or other device.

The ionic processing or energetic treatment that produces functional elements within the outer flexible material casing includes mechanical, electromagnetic and/or chemical properties supporting dynamic improvement in force and energy storage, impulse function in shaped memory alloys, vapor transmission through induced permeability through electrical current or mechanical response, induce plasma discharge (i.e. replace electrical contactors on spacecraft, satellite or induction coil), and/or generation of electricity with the casing material.

Environmentally friendly energy storage is one of the greatest challenges of the 21st century. Hundreds of billions of dollars has been invested in fuel cells and chemical batteries. A better solution is mechanical storage of energy because it's much better for the environment. Introducing the Mechanical Bellows Energy Storage System, the first mechanical storage system of its kind. It has been found that this system can safely store as little as 100 watts to as much as 50 kilowatts of energy. The energy stored in the outer flexible material casing can then be used in a wide variety of applications from producing electricity to helping power electric vehicles. The bellows structure has advantages of robust, reliable structures, lightweight and deployable as it can be shipped or transported in a contracted geometry reducing volume requirements.

The energy storage system of the subject invention works by storing energy in a highly efficient and reliable bellows structure (like pleated rings). The system is easily scalable based on the number and size of the rings. The bellows is made from materials that allow energy to be stored in the bellows and then later transferred to whatever is to be powered without the use of electrolytic or chemical based batteries. The bellows may also harvest power from rotating machinery producing or transferring power. This is particularly true for wind turbines that produce power only when the wind is blowing. The bellows can store excess energy for periods when the wind is not blowing and transfer energy back through the wind turbine generator to produce electricity on demand.

The bellows is a multifunctional structure that preferably incorporates shaped memory materials (alloys and/or plastics) that assist in harvesting thermal and light energy and enhances energy storage capacity efficiency. The positional storage of energy within the outer flexible material casing may be both the contracted or extended geometry creating a versatile transfer device for linear and rotational power. In this concept the bellows is both an energy storage device and a power storage device.

The energy storage system harvests energy as a multifunctional structure from mechanical (rotational, linear and vibratory) energy, heat (hot and cold), and pneumatic and light/electromagnetic (EM) sources. Due to the unique multifunctional structure, the bellows may also be "charged" or energized by traditional electrical current sources producing not only a storage device but a mechanical power driver simultaneously so that it will store energy based on positional geometry and drive other devices while configuring to its new position.

The energy storage system is also a multifunctional structure capable of independent operations. In other words, no environmental or mechanical input is exclusionary. The bellows of the energy storage system may operate as a pneumatic device, but is not dependent on air or other gases and may change geometry through other inputs from conventional rotating or liner displacement motion to vibration as well as electrical current, light or electromechanical sources or heat (hot or cold) including a heat differential based upon the materials and/or devices used for the fabric structure and folds. Further the energy storage system, as a mechanical system may also be used to drive power trains and other types of machinery.

The multifunctional bellows structure incorporating shaped memory alloys may be integrated with springs that augment the fold supporting rings. The rings may also be a shaped memory alloy round wire or flat ring that maintains specific geometry of the bellows while operating in high vibration environments. The outer flexible material casing may incorporate either embedded shaped memory alloy (SMA) wire or thin film deposited SMA metal films creating an actuator within the casing. Further the outer flexible material casing of the bellows may provide a shaped memory capability based upon laser, e-beam or thermal modification of the casing to create a thermally reactive element within the casing. The bellows may also have piezo electric and other electricity generating devices or substrates applied to the outer flexible material casing or bellows structures to generate electricity based on motion or vibration.

The energy storage system may be integrated into a robotic arm supporting control, power and motion functions. Ideally the robotic arm is designed to function as a combined thermal-power storage device and motion control system particularly possessing self-organizing control when produced with shaped memory alloys as actuator devices.

The energy storage system may also be mounted with a fixed side to a platform, heat sink or surface creating an accordion shape. The accordion shaped bellows would operate as a Trevelyon rocker to generate electricity, harvest energy and power for storage or function as a space propulsion device when integrated with a nozzle or heat pipe. Trevelyon rockers refer to the phenomenon of metal devices that vibrate or rock based upon a significant temperature different between them and the surface they contact. The bellows may function based upon the ring mass supporting the bellows folds. The rings are fixed on one side to a point that permits the bellows to rock back and forth while expanding and contracting. This mechanical system effect can generate electricity based upon the devices resident in the bellows, induce a power cycle in another device, drive a generate external to the bellows, provide a heat pump system, or drive an acoustic or thermal acoustic ion engine.

The mounting platform may be a solar contractor and cell collecting and storing significant amounts of heat in a metal heat sink or attached bellows to drive the Trevelyon rocker phenomenon. The Trevelyon rocker bellows device may be used to effect orbital torque or transfer changes on small satellites and other spacecraft including natural bodies such as asteroids as the Bellows Trevelyon is scalable it can adapt most any size satellite or vehicle or be placed in multiples. The advantage to implementing a bellows based Trevelyon rocker is the increased mechanical capacity while using energy harvested from the environment, solar energy or heat from the sun or heat from waste heat operations with a vehicle or other device within a very lightweight bellows.

Accordingly, it should be understood that the energy storage system of the subject invention has numerous functions and uses. Such functions and uses include, but are not limited to, using the energy storage system of the subject invention as a radiator as well as an energy storage device; as a radiator and thermal management device for solar concentrator cells; to power sensors and other processing devices, including sensors and processing devices imbedded in the outer flexible material casing; providing a space or satellite deployable radiator and energy storage device; for use in deploying satellites; to actuate or operate an automated device or robotic component; to augment an electric motor in start-up of an electric vehicle, reducing load on the motor; for use in conjunction with the on-demand module to store energy and provide power to a motion control or drive system; to control the start up an automated device or robotic component; to collect heat from a solar concentrator cell to function as an active cooling device or radiator; configured individually or in a bank of bellows for startup of an electrically driven system; and to start up an automated device or robotic component.

It will be understood that the bellows of the energy storage system can have various configurations. Such as, but not limited to, being integrated with a heat pipe acting as a thermal management and power storage and generating system; or integrated with a heat pipe acting as an engine; or operates as a power drive device for rotating machinery and electrical generators; or is an automated device or robotic component; or is a robotic actuator that controls motion and stores energy by harvesting energy from the environment.

In a preferred embodiment a solar cell has a lens or prism attached to concentrate solar energy to the cell eliminating the need for reflector concentrator. The primary issue with this method of solar energy concentration is the increased need for thermal management that is both rapid and adaptive. The integration of the energy storage system using the bellows as a primary heat sink and radiator increases area of the radiator based on temperature increase through extension of the SMA (NiTi) materials and other thermally active fabrics and films. In a preferred embodiment the bellows collects heat from a solar concentrator cell to function as an active cooling device or radiator circulating air over a heat sink. In another preferred embodiment the bellows collects heat from a solar concentrator heat sink to charge the bellows for energy storage. It will be understood that the bellows of the energy storage system can operate to collect heat from a solar concentrator cell to function as
power drive device; or to collect heat from a solar concentrator cell to power an active cooling element; or to collect heat from a solar concentrator cell to power an active cooling element using a cooling loop within a heat sink plate; or to collect heat from a solar concentrator cell to power an active cooling element that is a thermal electric device attached to the heat sink plate; or to collect waste heat from a mechanical, electrical or optical system to reconfigure itself for energy storage or power storage; or to collect waste heat from a mechanical, electrical or optical system to power another device; or to collect waste heat from a mechanical, electrical or optical system to store power; or to collect waste heat from a mechanical, electrical or optical system to power a drive train or rotating generator or motor; or to collect waste heat from a mechanical, electrical or optical system to augment a power drive system; or to collect waste heat from its environment to store as energy or power; or to collect heat from its environment to store as energy or power.

Bellows

Figure 22:
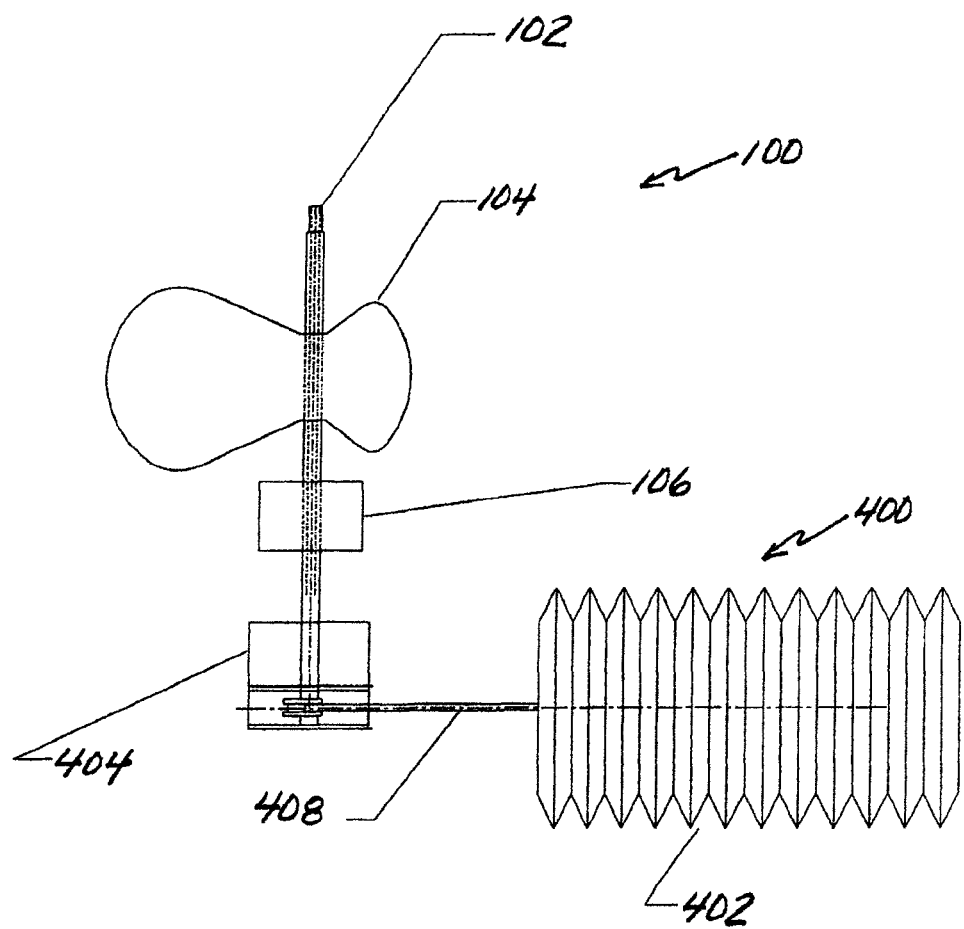
FIG. 22 is a schematic illustration of another preferred embodiment of the wind generator system having an energy storage system comprising a bellows system.

Referring to FIG. 22, in another preferred embodiment of the wind generator system 100 further comprises an energy storage system 400. Preferably, the energy storage system 400 (is should be understood that the energy storage system as described herein is not limited to wind generator systems but can be used or incorporated in various applications) is a mechanical energy storage system that eliminates the need for batteries and increases the efficiency of the system 100 by reducing loss of electricity such as through battery efficiencies and electrical resistance. One such energy storage system 400 is shown comprising a bellows 402 whereby rotational energy, such as that produced by rotation of drive shaft 102 (or by another source of energy, such as but not limited to: solar, heat, vibration, etc.) is transferred such as by a mechanical coupling 404, such as a gearbox or another conventional energy transfer mechanism, that moves a piston 408 (or other mechanical system) that operates to expand the bellows 402 to store energy as potential energy within the position of the bellows 402 (within the casing of the bellows). To retrieve the energy, the bellows 402 is allowed to compress or contract thereby moving the piston 408 (or other mechanical system) to transfer the energy back from the casing through the mechanical coupling 404 to rotate the generator assembly 106.

Figure 23:
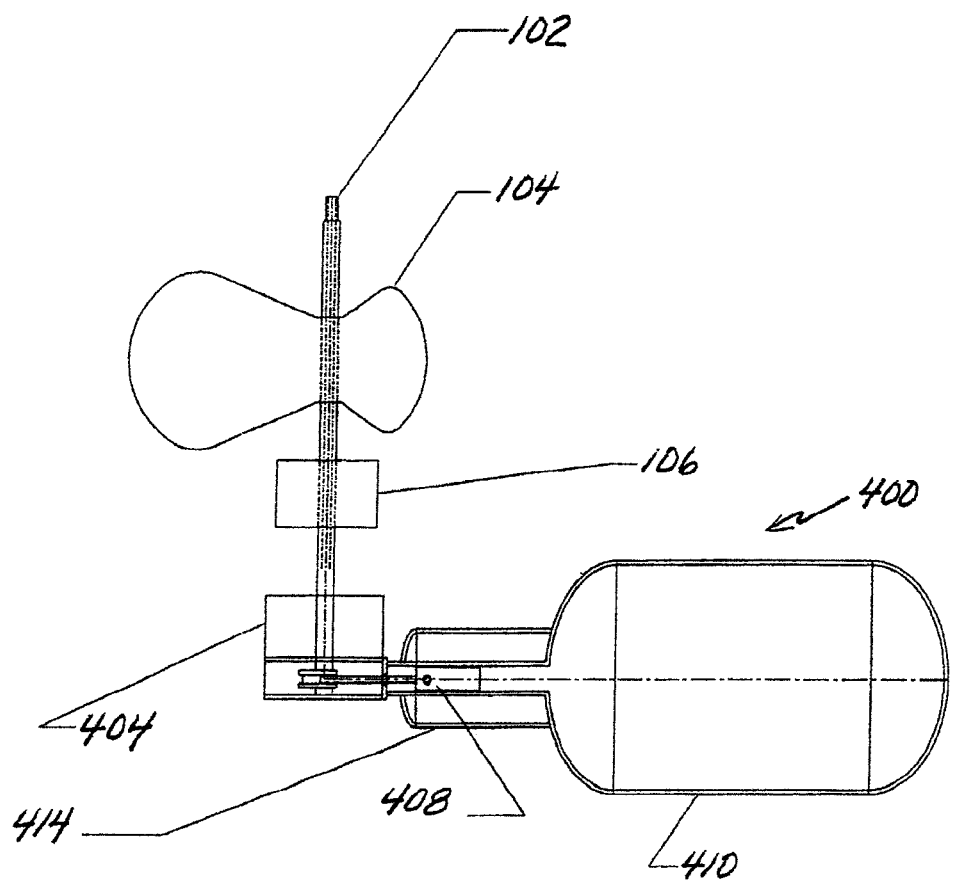
FIG. 23 is a schematic illustration of another preferred embodiment of the wind generator system having another preferred embodiment of an energy storage system comprising a pressurized fluid storage system.

In another preferred embodiment of the invention as shown in FIG. 23, the energy storage system 400 is a hydraulic storage system whereby rotational energy, such as that produced by rotation of drive shaft 102 is transferred such as by a mechanical coupling 404 to a hydraulic cylinder 410 such that a piston 408 operates to transfer fluid 412 from a pressurization reservoir 414 to the hydraulic cylinder 410 to store the rotational energy as potential energy. To retrieve the energy, the pressurized fluid within the hydraulic cylinder 410 is allowed to compress or contract thereby moving the piston 408 to transfer the energy back through the mechanical coupling 404 to rotate the generator assembly 106.

Shape Memory Materials

Figure 30:
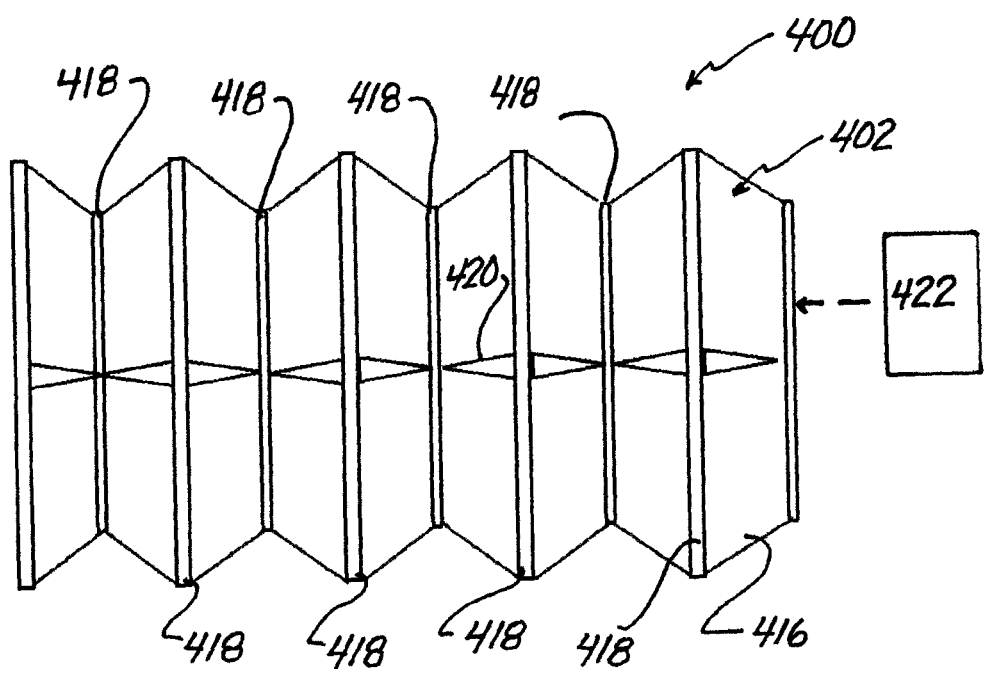
FIG. 30 is a schematic illustration of a preferred embodiment of the energy storage system in the form of a mechanical bellows (non-pneumatic) having a flexible material casing with support elements and a shaped memory alloy material integrated within the flexible material casing in communication with a heat source.
Figure 40:
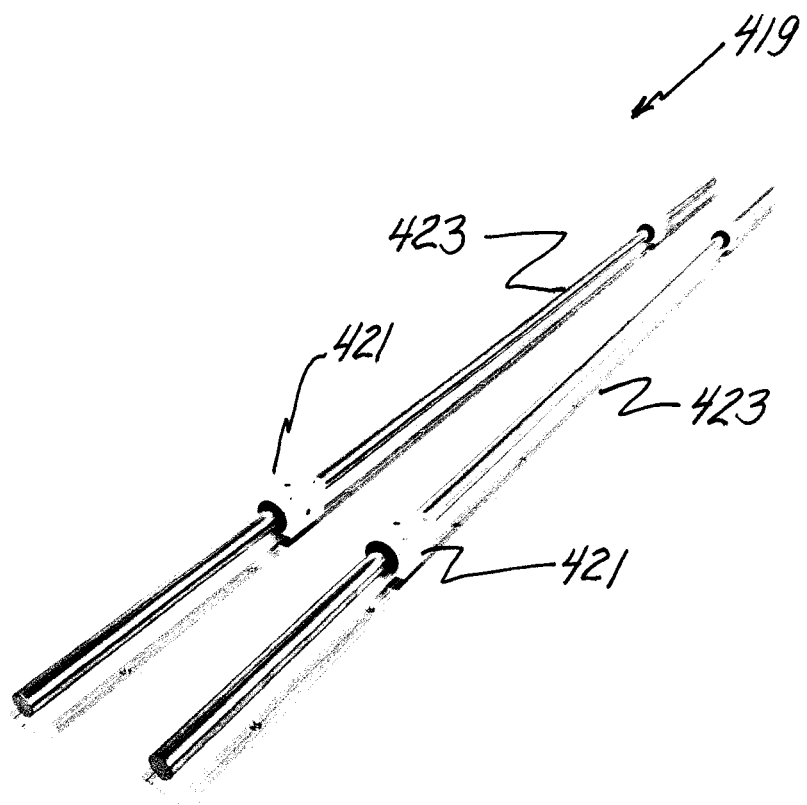
FIG. 40 is an image showing a magnetic rail system of the energy storage system for attaching to the support elements of a bellows.
Figure 41:
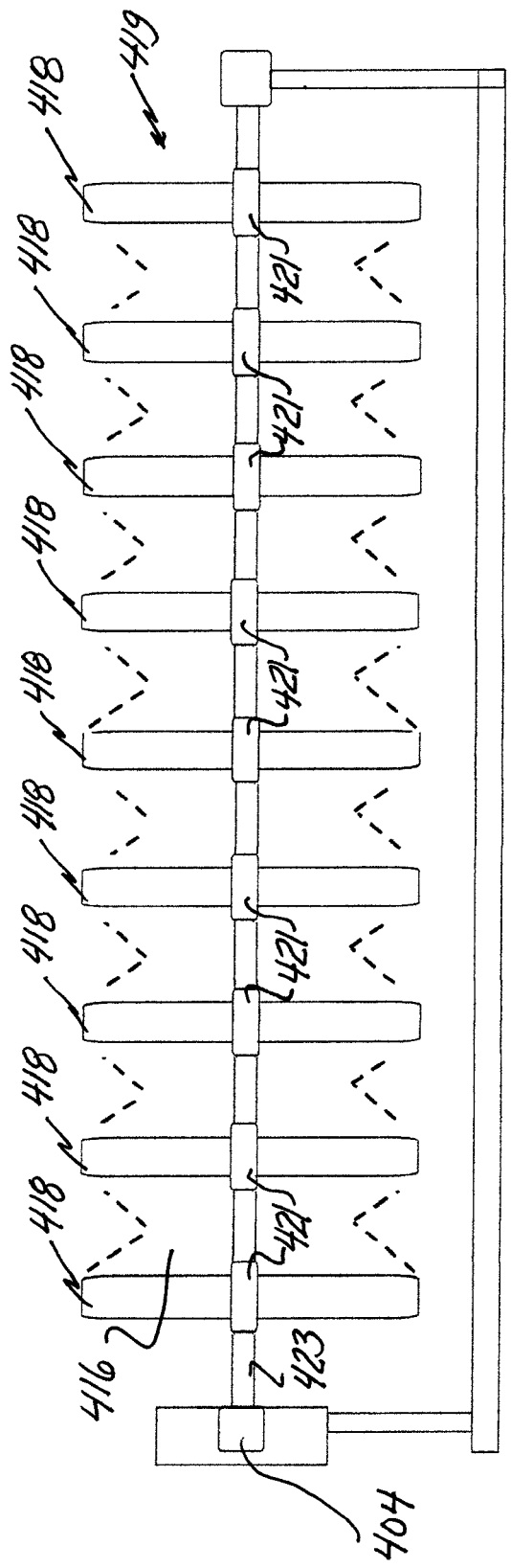
FIG. 41 is a schematic illustration of another preferred embodiment showing the bellows with support elements attached to a magnetic rail system of FIG. 40 having a permanent magnet bearing block connected to a support element which uses magnetic repulsion to slide over a linear magnetic rail.

Another preferred embodiment of the energy storage system 400 of the subject invention is shown in FIG. 30. The energy storage system 400 is shown in the form of a mechanical bellows 402 having an outer flexible material casing 416 for storing energy having support elements 418, such as pleated rings, positioned longitudinally along and coupled to the flexible material casing 416. Preferably, the support elements 418 alternate between relatively large diameter support elements and relatively small diameter support elements making that operate to improve the ability of the bellows to expand and contract. In a preferred embodiment, as shown in FIGS. 40 and 41, the support elements 418 are attached to a magnetic rail system 419 having a permanent magnet bearing blocks 421 connected to support elements 418 which uses magnetic repulsion to slide over linear magnetic rails 423. The use of such magnetic rail system significantly increases the mechanical efficiency of the expansion and contraction of the bellows.

In a preferred embodiment of the invention, as shown in FIG. 30, the outer flexible material casing 416 includes functional elements 420 formed from shaped memory materials (as described herein above) in the form of wire or thin film that are attached to or incorporated into the outer flexible material casing 416 and coupled to a heat source 422 that activates the functional elements such that they operate as actuators for expanding and contracting the bellows 402. In a preferred embodiment the heat source 422 is an electric heat source causing at least a portion of the shaped memory alloy (SMA) material to be heated such that shaped memory alloy material is above its transition temperature thereby creating a temperature differential thereby shortening the SMA material causing the bellows 402 to contract out of its equilibrium condition thereby storing potential energy for later use. It should be understood that the SMA material is deposited or embedded in the flexible material casing 416 that operate to improve thermal response from the environment by powering the bellows functions both as a power device and radiator. SMA material also can be used as a control mechanism based on their material properties and can respond to both thermal inputs or electrical current inputs. Other material processing methods, such as e-beam and laser that modifies a fabric in a particular pattern can also be used to create a differential in the flexible material casing that will enhance the material properties in effect inducing a greater efficiency in the harvesting of energy from the environment. In a preferred embodiment the functional element 420 formed from SMA material may be integrated with springs that augment the support elements 418. The support elements 418 may also be formed from shape memory alloy wire or flat ring that maintains a specific geometry for the bellows while operating in high vibration environments. Further, in a preferred embodiment the functional elements 420 positioned along the flexible material casing 416 provides a shaped memory capability based on laser, e-beam or thermal modification of the material casing to create a thermally reactive functional element within the material casing. In another preferred embodiment of the invention the bellows includes a piezo electric and other electricity functional elements in the form of generating devices or substrates applied to the material casing to generate electricity based on motion or vibration. In a preferred embodiment, the piezo electric current is created by excitement through motion of the bellows, extension of compression or vibration, that then produces an electric current which can be used to power the functional elements, such as a shape memory alloy (such as Nitinol or other similar functional material or materials) to produce further function or operation of the bellows. It should also be understood that the function elements can be also be deposited using a plasma deposition system such that the functional element (shape memory alloy) is a thin film actuator or other type of controlling device. It should also be understood that the mechanical bellows also provides a functional geometry for the functional element (shaped memory material or polymer) to operate an actuator and/or radiator.

Heat Source

Figure 31:
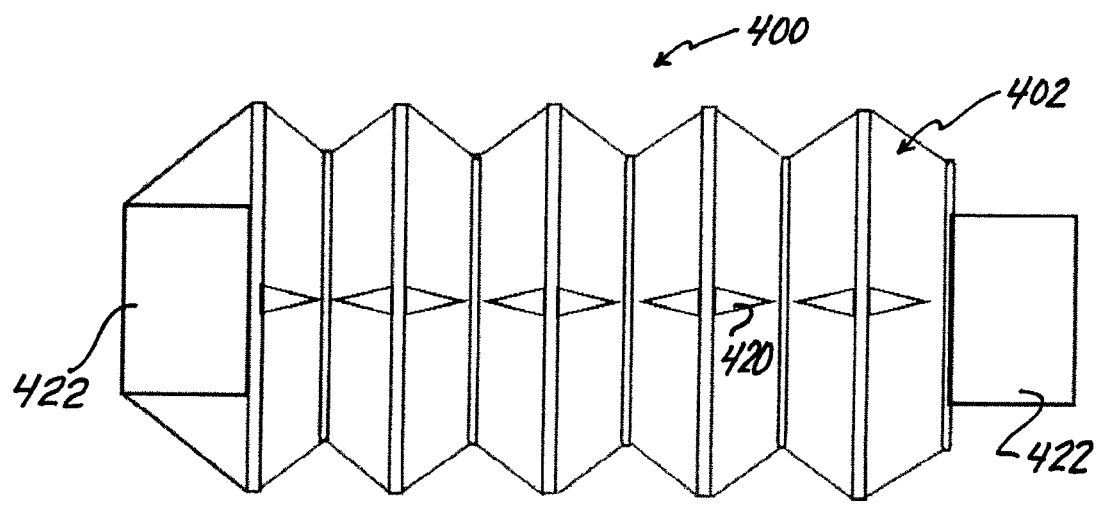
FIG. 31 is a schematic illustration of a preferred embodiment of the energy storage system in the form of a bellows that operates to harvest energy from a heat source such as a heat pipe.

Another preferred embodiment of the energy storage system 400 of the subject invention is shown in FIG. 31 whereby the heat source 422 is in the form of a heat pipe system such as one or more heat pipes positioned longitudinally within the bellows 402. By regulating the amount of heat traveling through the heat pipe system, the amount of compression or expansion of the SMA material 420 can be regulated thereby regulating the amount of contraction and expansion of the bellows 402 and the amount of energy stored by the bellows.

Figure 32:
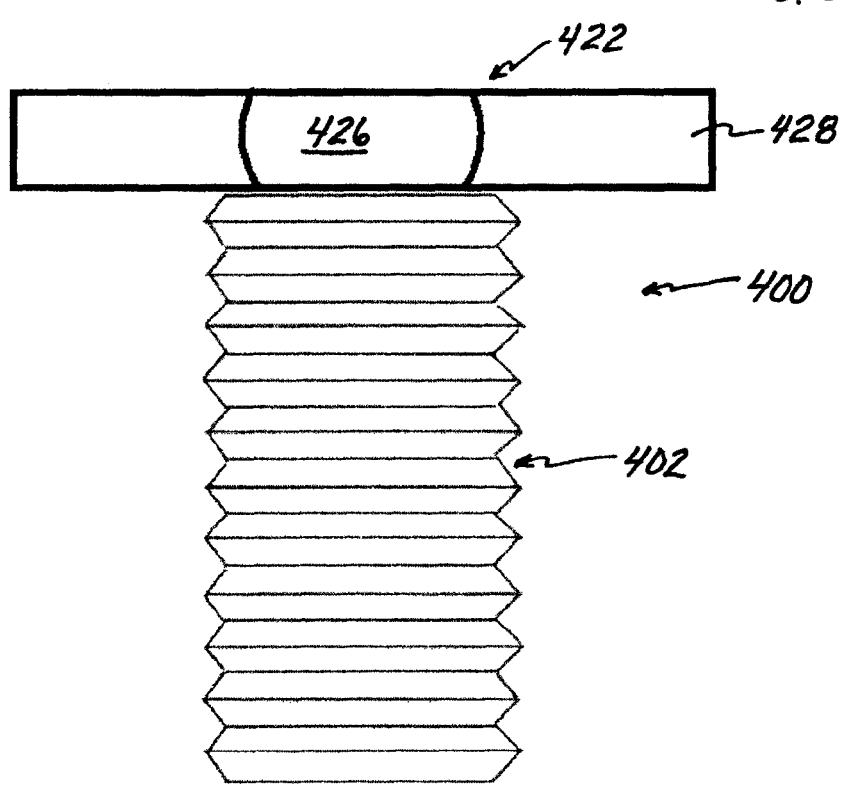
FIG. 32 is a schematic illustration of another preferred embodiment of the energy storage system in the form of a mechanical bellows that operates to harvest energy from a heat sink heated using a solar cell system.
Figure 33:
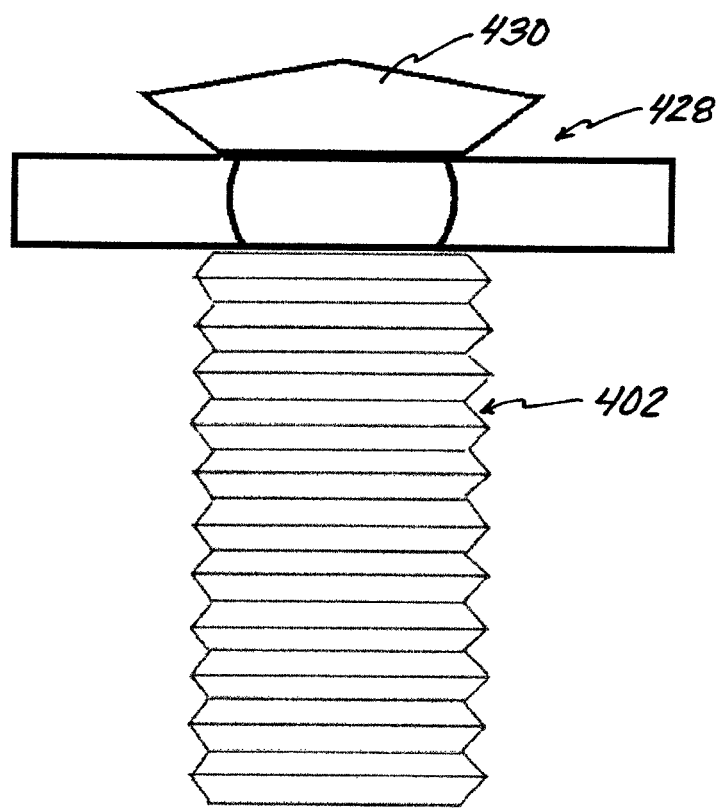
FIG. 33 is a schematic illustration of another preferred embodiment of the energy storage system in the form of a mechanical bellows that operates to harvest energy from a heat sink heated using a solar cell system with a concentrated solar cell system.
Figure 34:
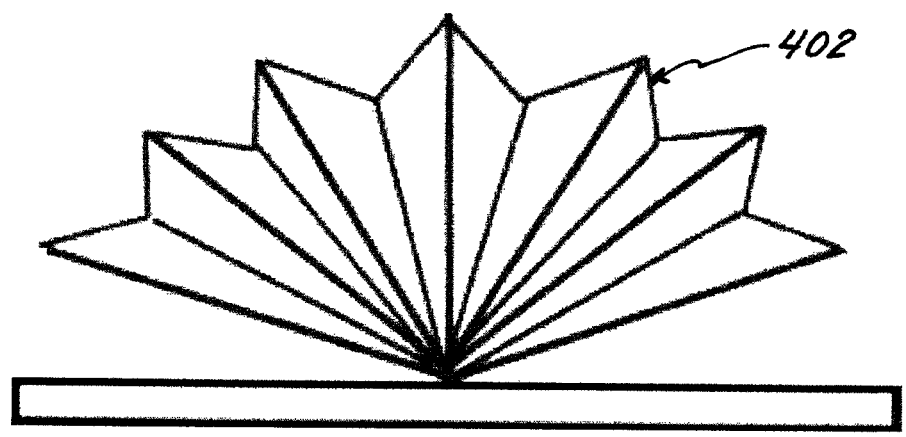
FIG. 34 is a schematic illustration of another preferred embodiment of the energy storage system having a bellows in the form of an accordion bellows Trevelyan Rocker coupled to a heat sink and heat exchanger.
Figure 35:
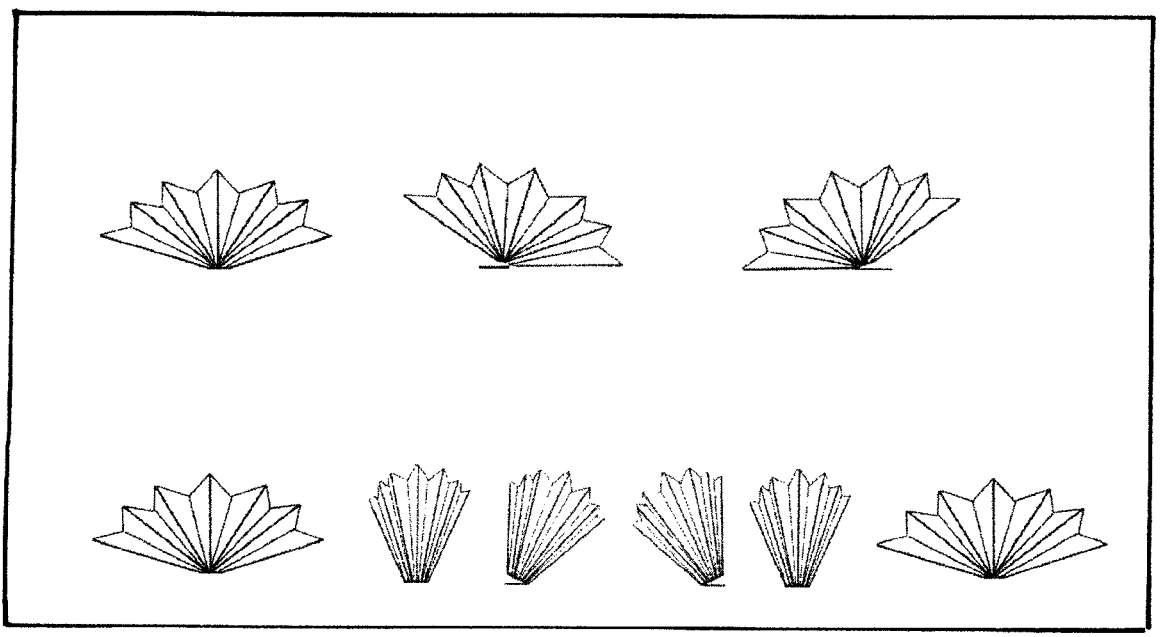
FIG. 35 is a schematic illustration of the energy storage system of FIG. 34 showing the bellows in various expanded configuration and compressed configurations.

Another preferred embodiment of the energy storage system 400 of the subject invention is shown in FIG. 32 whereby the heat source 422 is in the form of a solar cell 426 within a heat sink 428 longitudinally coupled to the bellows 402. In another preferred embodiment of the invention, as illustrated in FIG. 33, the heat sink 428 includes a solar concentrator lens 430 that operates to direct and concentrate solar energy to heat the heat sink 428. In a preferred embodiment the bellows operates to collect heat from the solar concentrator to function as an active cooling device or radiator circulating air over the heat sink or collects heat from the solar concentrator and heat sink to charge the bellows for energy storage. In another preferred embodiment, the bellows 402 functions as a Trevelyan rocker to generate electricity, harvest energy and power for storage or function as a space propulsion device when integrated with a nozzle or heat pipe. Trevelyan rockers utilize the phenomenon of metal devices that vibrate or rock based on a significant temperature difference between them and the surface they contact. In a preferred embodiment, the bellows function based on the ring mass supporting the bellows. The support elements 418 (rings) are fixed to the flexible material casing 416 such that the bellows 402 can rock back and forth while expanding and contracting (FIGS. 34 and 35). This mechanical method generates electricity using devices resident in the bellows, such as inducing a power cycle in a device, drive a generator external to the bellows, operate a heat pump system, drive an acoustic or thermal acoustic ion engine or other such devices.

Figure 36:
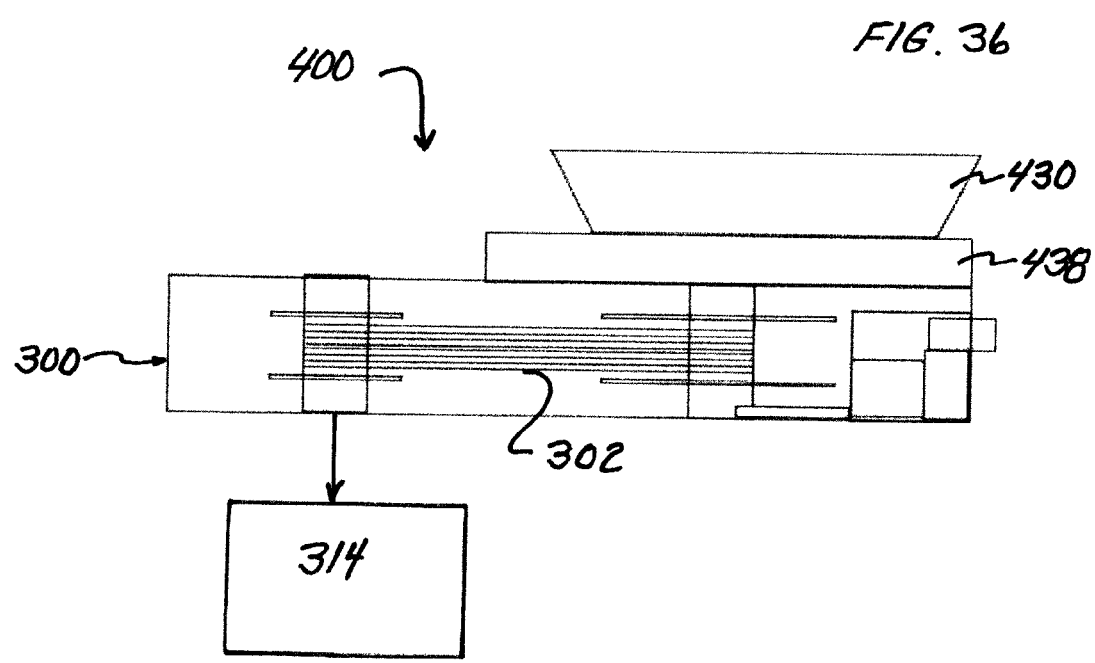
FIG. 36 is a schematic illustration of another preferred embodiment of the energy storage system in the form of a bellows coupled to an energy enhancer element coupled to a heat sink with a solar concentrator lens for heating the heat sink.

In another preferred embodiment of the invention, as illustrated in FIG. 36, the energy storage system 400 comprises an energy enhancer element 300, as described above, coupled to a heat sink 438 coupled to a solar concentrator lens 430 which operates to heat the SMA endless wire or band 302 which rotates to drive an electric producing device 314 or battery.

Figure 37:
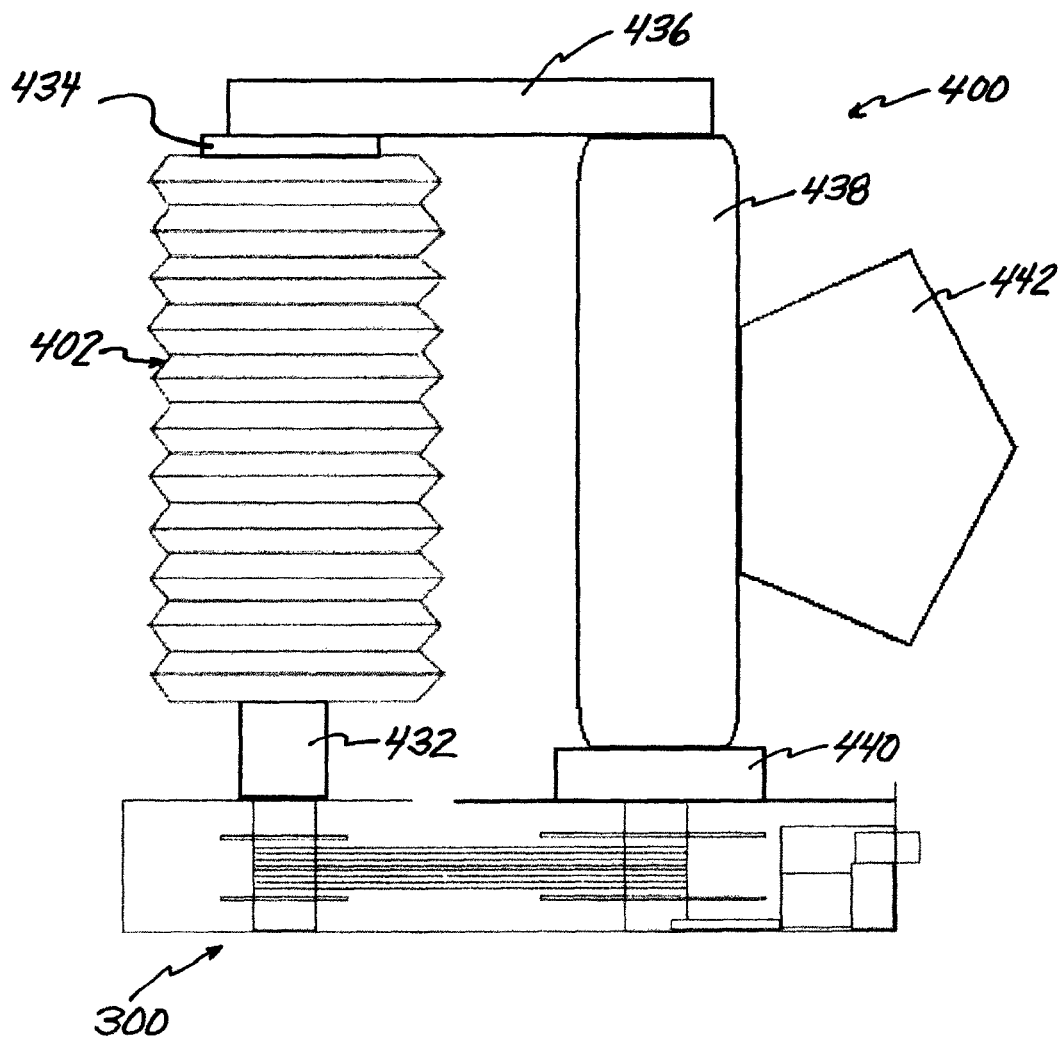
FIG. 37 is a schematic illustration of another preferred embodiment of the energy storage system having a mechanical bellows coupled to an energy enhancer element at one end and a heat exchanger at the other end, a heat sink is coupled to the heat exchanger at one end and to the energy enhancer element at the other end, a solar lens/prism collector is provided for heating the heat sink.

In another preferred embodiment of the invention, as illustrated in FIG. 37, the energy storage system 400 comprises a bellows 402 coupled at one end to an energy enhancer element 300, as described above, by a motion/power transfer device 432 and at a second end by an adaptive heat pipe/thermal power transfer coupling 434 to a heat exchanger 436. The heat exchanger 436 is also attached to one end of a heat sink 438 which is coupled at a second end to a second heat exchanger 440 for connecting to the energy enhancer element 300. Preferably the heat sink 438 is provided with a solar lens/prism collector 442 for improved heating of the heat sink 438. As shown, the solar lens/prism collector 442 operates to concentrate solar energy to the cell eliminating the need for a reflector concentrator. The integration of the bellows as a primary heat sink and radiator not only increases the area of the radiator based on temperature increases through extension of the SMA materials and other thermally active fibers and films.

Bellows Casing

Figure 42:
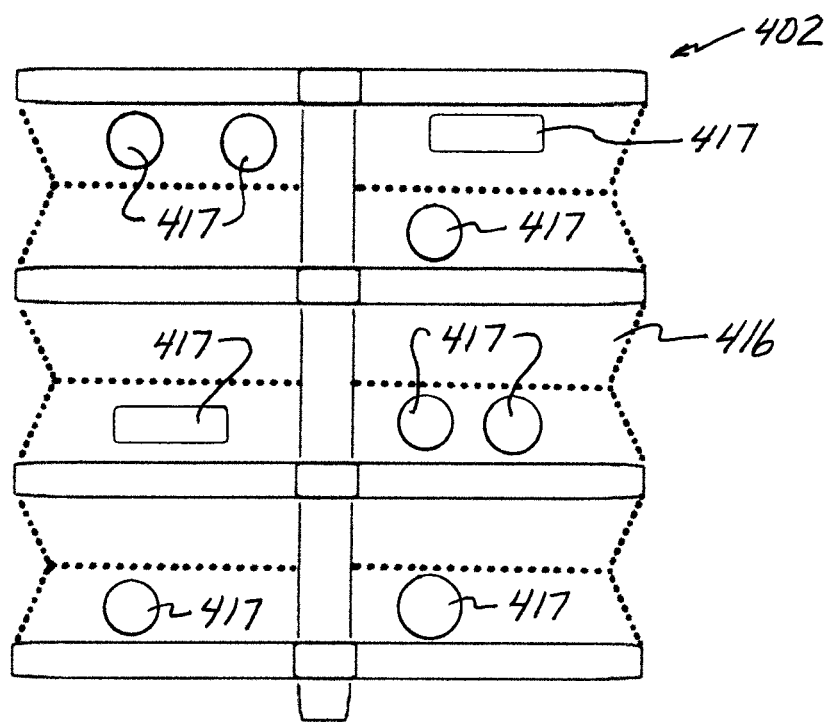
FIG. 42 is a schematic illustration of another preferred embodiment of the energy storage system showing the outer flexible material casing as an engineered substrate or a technical fabric or film having specific areas of the material casing having different properties and shape memory alloy material under controlled activation for regulating the energy storage and release by the bellows.

In another preferred embodiment of the invention, the outer flexible material casing 416 is an engineered substrate or a technical fabric or film treated directly or selectively by applying chain scission to specific areas 417 (FIG. 42) of the material casing 416 operates to induce different properties for the specific areas 417 of the casing 416. In another preferred embodiment, the outer flexible material casing can be formed from different materials at specific areas or patterns thereby changing the physical properties of the casing at different locations. Accordingly, these specific areas 417 along the outer flexible material casing 416 operate as devices resident in the material casing and provide differences in in the casing's mechanical or physical properties along the casing and by using various geometries (patterns) of the specific areas 417 the force for extending and compressing the casing for energy storage and delivery can be designed for particular applications. These specific areas having various geometries (pattern or patterns) within the outer flexible material casing operate as a multifunctional structure providing increase ability to control or induce the geometric response of the casing to various mechanical, physical or environmental inputs and its energy harvesting capacity. In a preferred embodiment the outer flexible material casing is removable and replaced by a different outer flexible material casing. It should now be apparent that the operation of the bellows, such as the amount of force (energy storage) for compressing or expanding the outer flexible material casing can be modified by replacing the casing with a different casing having different material properties.

In another preferred embodiment, the specific areas 417 can include functional elements 420, such as shape memory materials in the form of wire (or in wire patterns), are incorporated into the outer flexible material casing 416 at specific locations within the casing 416 are each are coupled to a heat source, such as an electrical system for supplying electric current to the functional elements 420. In a preferred embodiment, by regulating the operation of the functional elements, such as for a specific shape memory material that is supplied with electric current and/or the amount of current, the energy storage properties of the casing can be regulated. In another preferred embodiment, the functional elements 420 are positioned along the specific areas 417. In a preferred embodiment, as illustrated in FIG. 43, the functional elements 420 is shown formed by a proceed described above, includes a plurality of spires 447. The functional element 420 is a multifunctional element that is modified by the application of a mask creating the "star pattern" within the specific area and then is exposed to an electronic beam, corona discharge, chain scission, laser beam or other energetic or chemical process that induces new properties into the material casing in the pattern of the masked specific area. The processed multifunctional elements can function passively by improving the function of adjacent functional elements 420a by virtue of the modification of the mechanical properties of the processed specific area. The modification of the mechanical properties may include greater elasticity, greater stiffness, improved thermal transmission, increased electrical conductivity or any number of other engineered characteristics to satisfy particular functions. An advantage of the "star pattern" for the functional element 420 is that operates to create a controlled force generating from the specific area 417 by spires 447 allowing for varied geometry of the outer flexible material casing 416 that operates to control the force being applied to the outer flexible material casing by the functional element acting as an actuator to expand or contract by controlling power to all or some of the plurality of spires 447. An advantage of the star spire geometry, as shown, for the processed functional element is that it can increase force of compression or extension according to a number or inputs such as heat or current. It will create a greater response passively when the functional elements induce motion in the casing adjacent to the plurality of spires. The functional element can be excited through an external stimulus or increase function passively with adjacent functional elements, such as other shape memory materials. The processed multifunctional elements can function passively by improving the function of adjacent functional elements It should also now be apparent that by modifying the properties of the outer flexible material casing of the bellows at different locations and by using shape memory allows, the energy storage and release by the bellows can be precisely controlled. It should also be understood that functional elements may also be components, such as solar cells, antennas, communication systems, etc. that either operate using energy from the energy storage system or operate to supply energy for storage by the energy storage system.

It is known that polymer fabrics and films properties can be modified by chain scission or the breaking the chainlike molecule of a polymer as a result of chemical, photochemical, etc. reaction such as thermal degradation or photolysis. According, in a preferred embodiment of the invention the outer flexible material casing is treated by directly or selectively applying chain scission of specific areas to induce new properties in the selected specific areas of the outer flexible material casing.

Corona discharge treatment is a method for treating the surface of an inert plastic such as polyolefin with corona discharge to increase its affinity to inks, adhesives or coatings. Plastic films are passed over a grounded metal cylinder with a pointed high-voltage electrode above it to produce the discharge. The discharge oxidizes the surface, making it more receptive to finishing. Also called corona treatment. In a preferred embodiment, the outer flexible material casing is processed by corona discharge treatment directly or selectively to specific areas to induce new (change) its physical properties.

It is known that ion beans, particle accelerators and lasers modify the surface of materials. The mechanisms are well understood for many applications including modification of polymer chains in films, preparation for thin film deposition of metals and ceramics to increase adhesion and modification of mechanical properties to increase responsiveness to thermal and photonic exposure. These methods utilizing low-energy ion beams, lasers and higher energy linear accelerator produce an engineered substrate (functional elements). The process design may include multiple sources for the production of the desired surface or mechanical, structural or chemical properties of the material. These methods of dynamic response of fabrics and the reactive, thermal or optical response of the thin film alloy or ceramic. The specific exposure of the surface can be controlled through beam manipulation or "masking" of an "untreated" area to produce a particular geometry or modification within the material or substrate.

The various methods of treating the outer flexible material casing or one or more specific areas of the outer flexible material casing results in creating an engineered substrate or an Artificial Neural Membrane (ANM) material casing. One desired effect that can be obtained includes creating a desired thermal permeability by creating specific areas having a desired thermal permeability, thereby creating and regulating the dynamic response of the bellows, increasing efficiency of the bellows and/or establish a particular range of operation based on temperature and other environmental inputs. These environmental inputs can include vibration, light including coherent light, external heating sources such as induction heaters, chemical and reactive magnesium heaters, heat sinks, directed solar energy, radiators, wave motion, and rotating energy.

In another preferred embodiment, the outer flexible material casing is thermal permeable where heat can be transmitted through the casing, such as heat produced by operation of the bellows, or solar heat or heat from other machine of devices where the heat can be absorbed by a heat sink. In a preferred embodiment, the heat sink can then be cooled by air flow created by the expansion and contraction of the bellows. Accordingly, it should now be apparent that the bellows can operate as a heat pipe whereby the bellows harvests heat by virtue of its material and geometry, from surrounding devices, machinery or direct exposure to solar energy. Thus, the bellows operates to produce cooling for a connected component, device or system, but can also power the functional elements of the bellows to produce further motion for powering electrical generation or positioning other devices or systems, such as an actuator, rotary, rack or other drive component as in a motionless motion element. The powering of electric generation may be external to the bellows, such as an electrical generating component, alternator, servo, or permanent magnet generator or a piezo electric device resident within the bellows that induces current for bellows function increasing primary motions to the connected external components and devices or the resident devices within the bellows driving other functions resident within the bellows, such as controlling bellows geometry optimizing its control or external devices and systems. Thus. As a multifunctional structure the bellows supports functions as a thermal management system for a variety of devices and systems requiring cooling as well as a device for generating motion and/or electricity. In this respect, the bellows functions as a radiator that also powers other devices and systems by virtue of its function in extension and compression as well as being able to generate electrical current within the bellows, such as by piezo electric or other functional or reactive materials resident in the bellows. For example, in the case of a solar concentrator, the bellows can provide cooling of the concentrator solar cell to increase its efficiency while harnessing the thermal energy to produce additional current, provide motion control of the solar concentrator dish to follow the sun, or to power other devices and systems external to the solar concentrator and bellows. In another example, for a spacecraft, the bellows can support multifunctional operations, such as thermal management (acts as a radiator or heat pump) and by virtue if the bellow's functional elements, it can also provide electrical power or power drive functions for positioning devices resident on the spacecraft or powering devices resident on the spacecraft. Further, the unique character of the bellows and its multifunctional structure provide for a lightweight, low volume compressed state for launch and a novel deployable structure that may be stored in orbit until needed and then expanded as a free flyer or attached to a larger orbiting platform to support power, positing and plasma control functions as needed.

EXAMPLES

Figure 38:
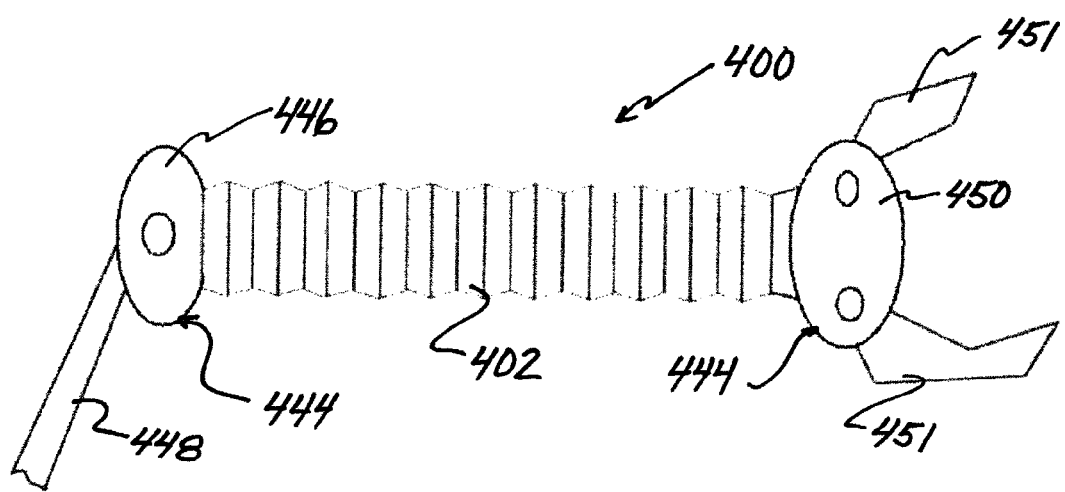
FIG. 38 is a schematic illustration of another preferred embodiment of the energy storage system having a mechanical bellows for powering a secondary device such as a robotic arm or gripper.

The energy storage system of the subject invention can be integrated into a robotic arm supporting control, power and motion functions. Preferably, the robotic arm is designed to function as a combined thermal-power storage device and motion control system particularly possessing self-organized control when produced with SMAs as actuator devices. In a preferred embodiment of the invention, the energy storage system 400 operates to power a secondary device 444, such as a robotic arm. As illustrated in FIG. 38, a bellows 402 is shown having one end coupled to an SMA rotary actuator 446 (elbow movement) for moving an arm support 448. The other end of the bellows 402 is attached to a SMA rotary actuator (wrist movement) 450 for moving a gripper 451. In another embodiment of the invention, the energy storage system 400 is in the form of a mechanical bellows 402 having an outer flexible material casing 416 having support elements 418, such as pleated rings, positioned longitudinally along and coupled to the flexible material casing 416. Preferably, the support elements 418 alternate between relatively large diameter support elements and relatively small diameter support elements making that operate to improve the ability of the bellows to expand and contract.

Another example of the use of the energy storage system 400 using a bellows 402 is illustrated in FIG. 44. As shown, a mechanical bellows 402 as described above, is used for a deployment system, such as for use in an orbiting satellite, includes an outer flexible material casing 416, having at least one power source or collector 455, such as a solar cell or heat collection system, and at least one electric component 457, such as an antenna, attached to or coupled to the outer flexible material casing 416. In operation, when the bellows is expanded, the power collector and the electric component will also expand into their deployed position. It should now be apparent that the bellows activated satellite offers advantages in weight and volume in its compressed configuration. It can be utilized on any number of small sat payloads and can use a conventional cube sat dispenser. It should be understood that as a stack of four compressed bellows satellites will occupy the volume of one cube satellite (1U=10 cm*3). Further, the stacked bellows cube satellite may be deployed as four 1U cube satellites after extension or as two 2U, or one 4U. Further, due to the decreased volume and mass, the maximum cube launch volume of 12U sized satellite when applied to a bellows cube satellite will allow for a deployed bellows satellite system of 48U or four times the size of a conventional cube satellite stack. This creates substantial advantage in the types, duration and orbital altitude of a cube satellite deployed system. The bellows cube satellites can remain compressed in orbit in any stacked or single configuration until they are required for operation. Unlike conventional cube satellites, the bellows satellite technology can be stored for years until required in the event of a natural disaster, emergency communications, emergency orbital and deep space relay, remote sensing of solar and geophysical storms. The bellows satellite may then return to their compressed configuration to be stored in orbit until needed again and thus also reducing orbital drag by reducing the surface area of the bellows satellite.

It should also now be understood that the energy storage system of the subject invention can be used in a variety of applications, such as the bellows having an outer flexible material casing embedded with or supports a variety of devices to generate electricity, or to function as or power an antenna, or support sensors, such as for satellite operation or remote sensing of the space environment. Further, the energy storage system can be used for an orbital free flyer, in a constellation or for use in a captive satellite installed on another orbital platform spacecraft. It should also be understood that the energy storage device can be effective for use in captive sentry systems that are released to counter anti-satellite systems or threats; for use in satellites providing multifunctional support for larger spacecraft or space platform by being capable of extending to discharge current build-up on the satellite or for providing emergency power to the host platform.

Figure 39:
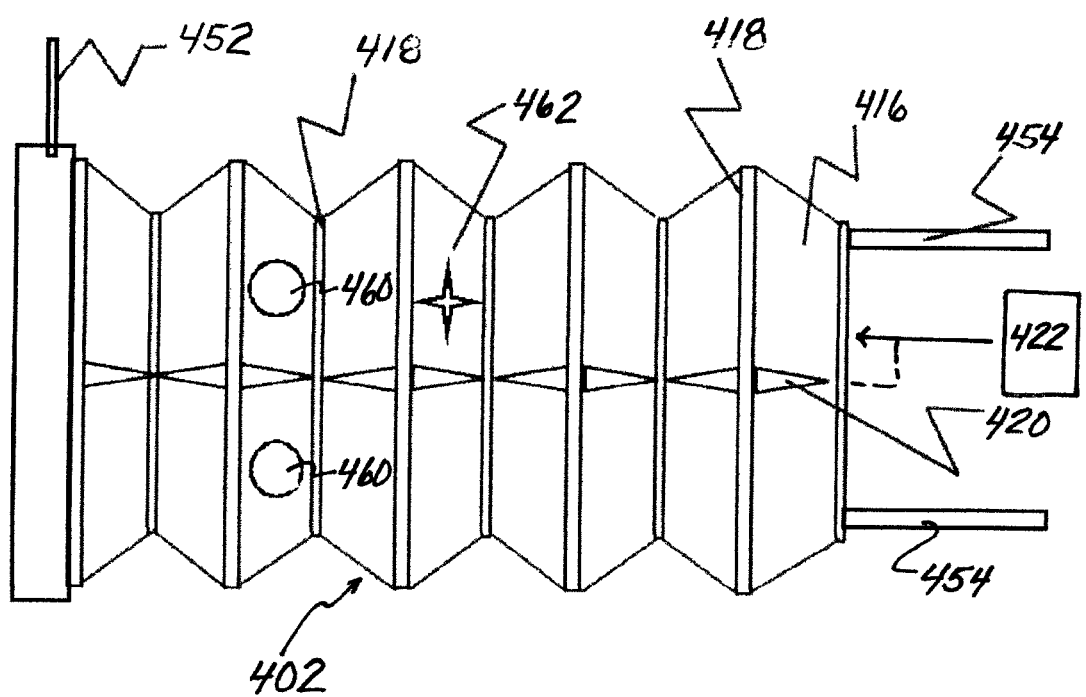
FIG. 39 is a schematic illustration of another preferred embodiment of the energy storage system for use in providing power to various devices employed in a satellite.

It should be understood that the energy storage system of the subject invention utilizing a Trevelyan rocker bellows system may be used to effect various systems such as orbital torque or transfer changes on small satellites and other spacecraft including natural bodies such as asteroids as the bellows is scalable and can adapt to most any size satellite or vehicle or placed in multiples. It should be understood that an advantage to implementing the energy storage system using a bellows in the form of a Trevelyan rocker is the increased mechanical capacity while using energy harvested from the environment, solar energy or heat from the sun or heat from waste heat operations with a vehicle or other device within a very lightweight bellows. In a preferred embodiment of the invention, as illustrated in FIG. 39, the outer flexible material casing 416 of the bellows 402 having support elements 418, such as pleated rings, positioned longitudinally along and coupled to the flexible material casing 416 and shaped memory materials 420 (as described herein above) in the form of wire or thin film that are attached to or incorporated into the outer flexible material casing 416 and coupled to a heat source 422 that together operate as an actuator for expanding and contracting the bellows 402. In a preferred embodiment one end of the bellows 402 is coupled to a communications/computing/control/battery pack which is provided with an antenna 452. The other end of the bellows 402 is coupled to a micro-torque rod 454. It should be understood that other devices, such as sensors 460 and micro-radiometers 462 may be attached to the bellows 402 and receives energy from movement of the bellows 402.

It should be understood that the energy storage system of the subject invention may comprise any combination of hydraulic systems, bellows systems, and battery systems. In a preferred embodiment, as illustrated in FIG. 45, the mechanical bellows 402 is formed from a multiple number of smaller mechanical bellows 402a which are be stacked together in a linear configuration, as shown, or work together in parallel. Such systems can be used together or in banks whereby conventional mechanical switches between individual storage systems operate to transfer potential energy between systems. It should also be understood that the energy storage system of the subject invention can safely store as little as 100 watts to as much as 50 kilowatts of energy and can be used in a wide variety of applications from producing electricity to powering electric vehicles. The use of bellows has the advantage of being robust, a reliable structure, lightweight, and deployable as it can be shipped or transported in a contracted geometry reducing volume requirements.

The energy storage system works by storing energy in a highly efficient and reliable mechanical bellows structure (like pleated rings). The system is easily scalable based on the number and size of the rings. It should be understood that the mechanical bellows of the subject invention will contract or extend based on environmental inputs (vibration, heat, cold and motion from a machine such as a rotating motion). The primary storage functions are therefore based on direct input for storage from machinery like a wind turbine as well as environmental elements like heat, cold, vibration, etc. These charge the bellows to extended or contracted positions providing a potential energy system and power storage device. It is a power storage device due to its capability to drive a mechanical or electromechanical device or machine from either the contracted or extended position. The bellows is made from materials that allow energy to be stored in the bellows and then later transferred to whatever is to be powered without the use of electrolytic or chemical based batteries. The bellows may also harvest power from rotating machinery producing or transferring power. This is particularly true for wind turbines that produce power only when the wind is blowing. The bellows can store excess energy for periods when the wind is not blowing and transfer energy back through the wind turbine generator to produce electricity on demand. The bellows is a multifunctional structure comprised of traditional bellows components such as rings and fabric or film type material, but also incorporates shaped memory materials (alloys and/or plastics) that assist in harvesting thermal and light energy and enhances energy storage capacity efficiency. The positional storage of energy within the bellows may be both the contracted or extended geometry creating a versatile transfer device for linear and rotational power. In this concept the bellows is both an energy storage device and a power storage device. The bellows harvests energy as a multifunctional structure from mechanical (rotational, linear and vibratory) energy, heat (hot and cold), and pneumatic and light/electromagnetic (EM) sources. Due to the unique multifunctional structure, the bellows may also be "charged" or energized by traditional electrical current sources producing not only a storage device but a mechanical power driver simultaneously so that it will store energy based on positional geometry and drive other devices while configuring to its new position. The bellows as a multifunctional structure is capable of independent operations. In other words, no environmental or mechanical input is exclusionary. The bellows may operate as a pneumatic device, but is not dependent on air or other gases and may change geometry through other inputs from conventional rotating or liner displacement motion to vibration as well as electrical current, light or electromechanical sources or heat (hot or cold) including a heat differential based upon the materials and/or devices used for the fabric structure and folds.

It should now be understood that in a preferred embodiment the energy storage system of the subject invention utilizes a bellows to collect heat from a solar concentrator to function as a power drive device and/or to power an active cooling element, such be using a cooling loop within a heat sink plate or to power an active cooling element that is a thermal electric device attached to a heat sink plate. It should also be understood that the energy storage system of the subject invention uses a bellows that collects waste heat from a mechanical, electrical or optical system to reconfigure itself for energy storage or power storage or to power another device or to store power or to power a drive train or a rotating generator or motor or to augment a power drive system. Further, the bellows collects such waste heat from its environment to store energy or power. Accordingly, the mechanical bellows of the energy storage system utilizing the shaped memory material (alloy or polymer) operates as an actuator and/or radiator.

It should now be understood to those skilled in the art that the wind generator system of the present application is easily constructed in modular form thereby reducing the time and cost needed to make repairs to the system. For the use of performance monitors and sensors reduces maintenance requirements and increases efficiency. Further, the wind generator system of the present application reduces the likelihood of damage resulting from high wind speeds often encountered by small wind generator systems without the need of relatively complex and expensive blade pitching devices, airfoil spoilers, blade tip breaks, braking means, and the like.

Further, it should also now be understood to those skilled in the art that the wind generator system of the present application is relatively acoustically quiet and aesthetically pleasing making them desirable for many residential applications.

It should also now be understood to those skilled in the art that the wind generator system of the present application can be used in a variety of applications. Systems can be incorporated into the exterior design of a structure, such as a building, such as along the roof, or as part of its landscaping, such as decorative structures. Further systems can be easily placed at locations having natural wind currents, such as between building structures or walls that operate as wind tunnels. By artistically or architecturally designing the housing, the wind generator system can be easily incorporated into an existing or future structure designs.

It should also now be apparent to one skilled in the art that a preferred embodiment of the wind generator system of the subject invention is new and novel and comprises a rotor mounted to a drive shaft, one or more blades attached to the rotor and extending radially outwardly from the rotor, a generator assembly coupled to the drive shaft and effective for generating electrical power, a mechanical energy storage system, wherein said mechanical energy storage system operates to store rotational energy of the drive shaft by converting rotational energy into potential energy stored in the mechanical storage system. Preferably, the mechanical energy storage system comprises a mechanical bellows having an outer flexible material casing and support elements positioned longitudinally along and coupled to the flexible material casing and shaped memory materials coupled to a heat source for extending and contracting the mechanical bellows. In a preferred embodiment the heat source is a heat pipe. In another preferred embodiment the heat source includes a heat sink heated by solar energy. In another preferred embodiment the heat source includes a heat sink heated by a solar cell and a solar concentrator lens. Preferably, the mechanical bellows functions as a Trevelyan rocker. It should also be understood that the mechanical energy storage system can be separated from the wind generator system and coupled to one or more secondary devices which are powered by the mechanical energy storage system. In a preferred embodiment the one or more secondary devices includes a robotic device or satellite devices.

Although the foregoing invention has been described in some detail for purposes of clarity of understandings, it will be apparent that certain changes and modifications may be practiced within the scope of any claims. It should now be apparent that the various embodiments presented can be easily modified while keeping within the scope and spirit of the subject invention. Accordingly, it should be understood that the present disclosure is to be considered as exemplary of the principals of the invention and is not intended to limit the invention to the embodiments and the specific examples illustrated and the invention is not to be limited to the details given herein, but may be modified within the scope and equivalents of the descriptions and examples contained herein.

The invention claimed is:

1. An energy storage system for storing energy and releasing energy to one or more secondary devices, wherein the energy storage system comprising:
   a bellows coupled to the one or more secondary devices, wherein said bellows having an outer flexible material casing with one or more functional elements coupled to an energy source whereby the energy is in the form of rotational energy or solar energy or heat energy or vibration energy that activates said one or more functional elements to function as actuators to expand or contact said bellows to store some of the energy from said energy source in said outer flexible material casing;
   wherein said outer flexible material casing further includes one or more additional functional elements that generate electricity when vibrated or moved and wherein said generated electricity is transferred to the one or more secondary devices.

2. The energy storage system of claim 1, wherein said outer flexible casing includes a chain scission treatment on one or more selected areas of said outer flexible casing that creates specific physical properties in said one or more selected areas.

3. The energy storage system of claim 1, whereon said outer flexible material casing has a corona discharge treatment and/or a chain scission treatment and/or an ion beam treatment and/or a particle accelerator treatment and/or a laser treatment applied to one or more specific areas on said flexible material casing that induces physical properties in said one or more specific areas.

4. The energy storage system of claim 2, wherein said one or more specific areas having thermal permeability that absorb heat from surrounding area of the bellows to expand or contract said bellows.

5. The energy storage system of claim 1 further comprising an electric component coupled to said bellows such that when said bellows expands said electric component is placed into a deployed position.

6. The energy storage system of claim 5, wherein said bellows operates to harvest energy from an environment and uses said energy to power said electric component or said one or more secondary devices.

7. The energy storage system of claim 1, wherein said one or more functional elements are thermally coupled to a heat source to activate said one or more functional elements to expand or contract said bellows.

8. The energy storage system of claim 1, wherein said bellows is formed from multiple smaller bellows.

9. The energy storage system of claim 1, wherein at least one of said one or more functional elements is in the form of a star pattern having a plurality of spires that control a force being applied to said bellows by said one or more functional elements to expand or contract said bellows.

10. The energy storage system of claim 1, wherein said energy storage system is coupled to an energy enhancer element.

11. The energy storage system of claim 1, wherein said bellows is in the form of a Trevelyan rocker.

12. The energy storage system of claim 1, wherein said one or more secondary devices is a communications/computing/control/battery pack having an antenna that receive electricity from said one or more additional functional elements that generate electricity.

13. The energy storage system of claim 1, wherein said one or more secondary devices is one or more sensors that receive electricity from said one or more additional functional elements that generate electricity.

14. The energy storage system of claim 1, wherein said bellows is mechanically coupled to a rotating drive shaft that moves a piston to expand or compress said bellows to store energy within said flexible material casing or release energy from said flexible material casing.

15. The energy storage system of claim 1, wherein said one or more functional elements are formed from shaped memory materials.

16. The energy storage system of claim 1, wherein said one or more additional functional elements that produce electricity are piezo electric functional elements.

17. The energy storage system of claim 1, whereby when said bellows expands or contracts, energy stored within said outer flexible material casing is transferred to said one or more secondary devices.

* * * * *